(12) United States Patent
Morikawa et al.

(10) Patent No.: US 8,172,114 B2
(45) Date of Patent: May 8, 2012

(54) REFRACTORY MATERIAL FOR NOZZLE FOR USE IN CONTINUOUS CASTING, AND CONTINUOUS CASTING NOZZLE

(75) Inventors: Katsumi Morikawa, Fukuoka (JP);
Akinari Sasaki, Fukuoka (JP);
Yoshitaka Hiraiwa, Fukuoka (JP);
Keiichiro Neba, Fukuoka (JP); Takashi Sadano, Fukuoka (JP); Shinichi Fukunaga, Tokyo (JP); Kazuhisa Tanaka, Tokyo (JP)

(73) Assignee: Krosakiharima Corporation, Tokyo (JP)

( * ) Notice: Subject to any disclaimer, the term of this patent is extended or adjusted under 35 U.S.C. 154(b) by 352 days.

(21) Appl. No.: 12/509,641

(22) Filed: Jul. 27, 2009

(65) Prior Publication Data
US 2010/0084441 A1 Apr. 8, 2010

(30) Foreign Application Priority Data

Jul. 28, 2008 (JP) .................................. 2008-193730
Jul. 28, 2008 (JP) .................................. 2008-193734
Aug. 6, 2008 (JP) .................................. 2008-203386

(51) Int. Cl.
*B22D 41/50* (2006.01)

(52) U.S. Cl. .......................... 222/606; 164/337; 164/437
(58) Field of Classification Search .................. 222/606, 222/607; 164/337, 437
See application file for complete search history.

(56) References Cited

U.S. PATENT DOCUMENTS

| 5,092,500 A | * | 3/1992 | Weber et al. .................. 222/607 |
| 7,172,013 B2 | | 2/2007 | Ogata |
| 2005/0067746 A1 | | 3/2005 | Ogata |
| 2009/0090481 A1 | * | 4/2009 | Morikawa et al. ............ 164/437 |

FOREIGN PATENT DOCUMENTS

| JP | 07-232249 | | 9/1995 |
| JP | 2007291415 A | * | 11/2007 |
| WO | 03/086684 A1 | | 10/2003 |

* cited by examiner

*Primary Examiner* — Scott Kastler
(74) *Attorney, Agent, or Firm* — Martin Fleit; Paul D. Bianco; Fleit Gibbons Gutman Bongini & Bianco PL

(57) ABSTRACT

In a insert-type continuous casting nozzle comprising a highly functional layer formed to have a high corrosion resistance, a high anti-attachment capability, etc., and provided to define an inner bore thereof, the present invention is directed to providing a refractory material (mortar) for an intermediate layer of the continuous casting nozzle, which has a property capable of fixing an inner bore-side layer to an outer periphery-side layer (a nozzle body) of the continuous casting nozzle, while preventing the occurrence of expansion splitting in the outer periphery-side layer due to a difference in thermal expansion between the inner bore-side and outer periphery-side layers, and a continuous casting nozzle using the refractory material for the intermediate layer. The refractory material for the intermediate layer contains a hollow refractory aggregate in an amount of 10 to 75 volume %, wherein a ratio of an average radius R of each particle of the aggregate to an average wall thickness t of the particle satisfies the following relation: $R/t \geq 10$. This refractory material is disposed between an inner bore-side layer (2) and an outer periphery-side layer (3, 4) of a continuous casting nozzle.

20 Claims, 2 Drawing Sheets

REFRACTORY MATERIAL FOR NOZZLE FOR USE IN CONTINUOUS CASTING, AND CONTINUOUS CASTING NOZZLE

TECHNICAL FIELD

The present invention relates to a continuous casting nozzle comprising an outer periphery-side layer and an inner bore-side layer having a thermal expansibility greater than that of the outer periphery-side layer, wherein the inner bore-side layer is disposed to define an inner bore surface for contact with molten steel.

In the present invention, the term "inner bore-side layer" collectively means any refractory layer located on the side of an inner bore of a continuous casting nozzle relative to an intermediate layer in a horizontal cross-section taken at any position of an overall length of the continuous casting nozzle oriented in a molten-steel passing direction (i.e., vertical direction), and covers any layer structure. For example, the inner bore-side layer may be made up of a plurality of layers. In this case, the term "thermal expansion coefficient of the inner bore-side layer" means a maximum one of respective thermal expansion coefficients of the plurality of inner bore-side layers.

In the present invention, the term "outer periphery-side layer" collectively means any refractory layer located on the side of an outer periphery of the continuous casting nozzle relative to the intermediate layer in the horizontal cross-section, and covers any layer structure. For example, the outer periphery-side layer may be made up of a plurality of layers (e.g., a two-layer structure consisting of an aluminum-graphite (AG)-based layer and a zirconia-graphite (ZG)-based layer located outside the AG-based layer). In this case, the term "thermal expansion coefficient of the outer periphery-side layer" means a minimum one of respective thermal expansion coefficients of the plurality of outer periphery-side layers.

The present invention also relates to a continuous casting nozzle having a structure in which an outer periphery-side layer and an inner bore-side layer are formed and shaped separately in such a manner that respective refractory matrixes of the two layers are devoid of continuity, i.e., formed into mutually independent shaped bodies, and fixed together through a deformable refractory material for an intermediate layer (in this specification, this continuous casting nozzle will also be referred to as "insert-type").

BACKGROUND ART

In a tubular refractory member having an inner bore for allowing molten steel or other high-temperature substance to stay therein or pass therethrough, such as a long nozzle for discharging molten steel from a ladle into a tundish, or an immersion nozzle for pouring molten steel from a tundish into a continuous casting mold (these nozzles will hereinafter be referred to collectively as "continuous casting nozzle"), a temperature gradient occurs between an inner bore-side region and an outer periphery-side region of the refractory member. Particularly, in an initial stage of discharging/passing of molten steel, the inner bore-side region or the outer periphery-side region is rapidly heated up, so that the phenomenon becomes prominent.

Irrespective of whether the refractory member has a single-layer structure or a multi-layer structure, such a temperature gradient gives rise to a strain due to an internal stress of the refractory member, which becomes one factor causing breaking, such as cracking in the outer periphery-side region. Further, as the temperature gradient becomes larger, and a thermal expansion coefficient of the inner bore-side region becomes larger with respect to that of the outer periphery-side layer, a thermal stress will be increased to cause a higher risk of breaking, particularly, in the outer periphery-side region.

As commonly-used measures against breaking due to the temperature gradient (thermal stress), there have been known various thermal-stress reduction techniques based on an increase in thermal conductivity, a reduction in thermal expansibility, a reduction in elastic modulus, etc., such as a technique of incorporating a large amount of graphite into a refractory material for a continuous casting nozzle, and a technique of adding fused silica with a small thermal expansion amount to a refractory material for a continuous casting nozzle or increasing a content of fused silica in a refractory material for a continuous casting nozzle. However, on the other hand, the increase in amount of graphite or fused silica involves deterioration in oxidation resistance and increase in reactivity with components of molten steel. This has a disadvantage of giving rise to deterioration in durability, such as erosion (abrasion) resistance and corrosion resistance, particularly, of the inner bore-side region.

A continuous casting nozzle is used under a condition that a molten steel flow passes through an inner bore thereof, while violently colliding against an inner bore surface thereof Thus, a region of the continuous casting nozzle adjacent to the inner bore surface will be particularly severely damaged due to abrasion (erosion) caused by the molten steel, non-metal inclusions in the molten steel, etc., structural embrittlement and washing (corrosion) caused by oxidizing components of the molten steel, etc., and melting loss caused by a reaction product with FeO and other components of the molten steel.

Further, recent years, in connection with an increase in amount of non-metal inclusions (such as alumina) in molten steel, attachment of inclusions (typically, alumina) onto the inner bore surface of the continuous casting nozzle, or clogging of the inner bore of the continuous casting nozzle due to the inclusions, become one key factor determining a lifetime of the continuous casting nozzle.

In the above circumstances, there has been an increasing need for a higher level of durability and safety (stable casting capability) of the continuous casting nozzle.

With a view to meeting the above need, it has been attempted to extend a lifetime of a continuous casting nozzle, in such a manner that a refractory material excellent in thermal shock resistance is used for a nozzle body (i.e., an outer periphery-side layer) of the continuous casting nozzle to form a backbone portion of the continuous casting nozzle, and a refractory material excellent in durability, such as erosion resistance and corrosion resistance, is disposed as an inner bore-side layer defining an inner bore surface for contact with molten steel.

In particular, with regard to the inner bore-side layer, various efforts for functional enhancement have been carried out. Therefore, lately, it has not been uncommon to define the inner bore surface by a lining made of a material reduced in content of carbon, a graphite-free material, or a material containing a component excellent in erosion resistance, melting-loss resistance, etc., such as a basic component. Further, with a view to reducing or preventing attachment of inclusions (such as an alumina component) onto an inner bore surface of an immersion nozzle, or clogging of an inner bore of the immersion nozzle due to the inclusions, one type of immersion nozzle has been increasingly used in which a refractory layer containing a CaO component highly reactive with an alumina component is provided on an inner peripheral surface of a nozzle body thereof.

The highly-functional refractory material contains a small amount of a material having a high capability to relax thermal expansion, such as graphite, and a large amount of refractory aggregate having high thermal expansibility. Thus, a thermal expansion amount of the inner bore-side layer is apt to be increased. Moreover, due to an increase in thermal gradient caused by an increase in thermal conductivity of the inner bore-side layer with respect to the outer periphery-side layer as a result of the reduction in carbon content, a difference between respective thermal expansion amounts of the inner bore-side layer and the outer periphery-side layer, and a resulting thermal stress, are apt to be more increased, which leads to a higher risk of breaking of the continuous casting nozzle, particularly, the outer periphery-side layer.

As an example of an approach to preventing the breaking due to a thermal stress of a highly-expansible inner bore-side layer, the following Patent Document 1 discloses a continuous casting nozzle which comprises a refractory sleeve prepared to contain CaO in an amount of 20 mass % or more and inserted into a nozzle body thereof, wherein a bonding material comprising a mixture of a refractory aggregate and a binder is applied onto a part or entirety of an outer peripheral surface of the sleeve or an inner peripheral surface of the nozzle body, or into a joint region defined between the outer peripheral surface of the sleeve in an inserted state and the inner peripheral surface of the nozzle body, and wherein the bonding material for the joint region is adjusted to have a porosity of 15 to 90% in a dried state thereof The Patent Document 1 discloses that the porosity of the bonding material for the joint region is adjusted by means of an increase/decrease in amount of the binder and a solvent each constituting the bonding material or a change in filling amount of the bonding material. This technique is intended to obtain a stress relaxation capability based on the porosity of mortar, i.e., voids in a mortar structure, and adjust a level of stress relaxation capability by means of an increase/decrease in amount of the binder and the solvent each constituting the mortar (bonding material) or a change in filling amount of the mortar.

However, in the above adjustment technique, a large amount of liquid (solvent and binder) is required to obtain a high stress relaxation capability, so that the mortar is liable to have fluidity. For example, this has a disadvantage of significant deterioration in shape retainability of the mortar to cause difficulty in ensuring a required thickness of a mortar layer or a fully filled state of the joint region. More specifically, in an operation of installing an inner bore-side layer in a nozzle body (i.e., an outer periphery-side layer) of a continuous casting nozzle, using such mortar having a high fluidity or low shape retainability, it is highly likely that the inner bore-side layer is displaced to cause an undesirable situation where the mortar layer has a region having almost no thickness, a region having an excessively large thickness, and/or a large number of void spaces. This situation precludes a possibility to ensure required capabilities, such as the stress relaxation capability and a capability of preventing molten steel and other foreign substances from intruding into the joint region, which leads, particularly, to breaking of the outer periphery-side layer and drop-off of the inner bore-side layer.

The above mortar layer is inevitably formed in a low-density structure and a weak binding structure, and thereby a structural strength thereof becomes lower. Thus, even if the inner bore-side layer can be fixed to the outer periphery-side layer (nozzle body of the continuous casting nozzle) in an intended relative arrangement through the mortar layer, the mortar layer is likely to be broken not only by an expansion force during stress relaxation under a hot condition but also by a weak external force during handling of the nozzle, to cause difficulty in maintaining structural stability. This gives rise to a problem that peeling, displacement or the like of the inner bore-side layer is likely to occur.

The above mortar layer has a high porosity, wherein a large continuous pore exists in the mortar structure. This gives rise to another problem that molten steel, slag component and other foreign substances are infiltrated in the mortar layer through the pore (including a broken and enlarged pore) as a pathway to cause melting loss or breaking of the mortal layer itself.

The above mortar contains a large amount of liquid to ensure adequate working efficiency during mortaring. Thus, the liquid is liable to be absorbed in target refractory layers to be bonded, to cause a change in concentration of a solid content of the mortar. This means that, if each of adjacent refractory materials has a different apparent porosity, a solvent contained in the mortar to provide flexibility and bindability thereto is absorbed in the refractory materials through contact therewith, and thereby compressibility and bonding strength of the mortar are changed in each region, which gives rise to a problem that the compressibility and bonding capability become instable depending on adjacent refractory materials and a thickness of a mortar joint. Further, during a course of the absorption and drying, the liquid is liable to cause a problem that shrinkage or crack occurs in the mortar layer itself, or gap or peeling occurs between the molar layer and each of the target refractory layers. Moreover, along with a reduction of amount of the liquid in the mortar, aggregate particles will agglomerate together, which is likely to give rise to a problem concerning bonding capability due to a higher risk of the occurrence of crack, peeling or the like in the mortar layer.

Further, the following Patent Document 2 discloses a casting nozzle having a two-layer structure in which only a portion of the nozzle on the side of an inner bore thereof (inner bore-side layer) is formed as a carbon-free refractory layer, i.e., a refractory layer having high thermal expansibility and high corrosion resistance, and the remaining portion on the side of an outer periphery thereof (outer periphery-side layer) is formed as a carbon-containing refractory layer, i.e., a refractory layer excellent in spalling resistance, wherein at least 80% or more of a contact surface between the inner bore-side and outer periphery-side layers is separated from each other by a separation layer which is formed by setting a burnable material, such as polypropylene or nylon, between the two layers, and then burning away the burnable material, during forming/shaping of the nozzle.

However, in the casting nozzle disclosed in the Patent Document 2, less than 20% of the contact surface between the inner bore-side and outer periphery-side layers is bonded together. Even if a bonded region is fairly small, it will be an origin of a phenomenon that splitting occurs in the outer periphery-side layer due to thermal expansion of the inner bore-side layer (hereinafter referred to as "expansion splitting"), because a stress causing the expansion splitting is transmitted from the inner bore-side layer to the outer periphery-side layer through the bonded region. If the bonded region is set at zero %, it causes a fundamental problem that the inner bore-side layer cannot be structurally supported. Moreover, in the separation layer in the Patent Document 2, i.e., a so-called hollow joint, molten steel easily intrudes into a void space of the joint, which gives rise to problems, such as cracks in the refractory layers due to solidification shrinkage of the molten steel occurring when it undergoes changes in temperature and expansion of the solidified steel occurring when it is heated, and peel-off of the inner bore-side layer due to no bonding between the inner bore-side and outer periphery-side layers.

Particularly, in a continuous casting nozzle comprising an inner bore-side layer, an intermediate layer and an outer periphery-side layer, where an MgO—CaO based material is used for the inner bore-side layer, depending on respective compositions of the inner bore-side layer and the intermediate layer, a damage, such as melting/washing, is rather likely to occur beyond a bonded region where the inner bore-side layer is in direct contact with the intermediate layer, which causes problems, such as melting loss, peel-off or reduction in fixing strength of the inner bore-side layer, breakup of the intermediate layer, formation of a hollow space between the inner bore-side and outer periphery-side layers, and intrusion of molten steel into the hollow space.

As above, in a continuous casting nozzle having a highly-expansible inner bore-side layer provided inside an outer periphery-side layer, a stress relaxation layer is required to have a capability to relax a stress to be caused by thermal expansion of the inner bore-side layer, a shape retainability allowing a required thickness and a filled structure to be obtained during an installation operation without a large continuous pore causing intrusion of molten steel and slag components, a structural strength enough to avoid breaking by an external force which is less than a stress caused by thermal expansion of the inner bore-side layer, and a supportability enough to prevent the inner bore-side layer from being peeled off from the outer periphery-side layer. However, any mortar layer having all the capabilities has not yet been obtained.

[Patent Document 1] Pamphlet of International Publication No. 03/086684

[Patent Document 2] JP 7-232249A

DISCLOSURE OF THE INVENTION

Problem to be Solved by the Invention

In a insert-type continuous casting nozzle comprising a highly functional layer formed to have a high corrosion resistance, a high anti-attachment capability, etc., and provided to define an inner bore thereof, it is an object of the present invention to provide a refractory material (mortar) for an intermediate layer of the continuous casting nozzle, which has a property capable of fixing an inner bore-side layer to an outer periphery-side layer (a nozzle body) of the continuous casting nozzle, while preventing the occurrence of expansion splitting in the outer periphery-side layer due to a difference in thermal expansion between the inner bore-side and outer periphery-side layers, and a continuous casting nozzle using the refractory material for the intermediate layer.

It is another object of the present invention to a refractory material (mortar) for an intermediate layer of the continuous casting nozzle, which has a capability to reliably prevent peel-off of the inner bore-side layer during casting operation, in addition to the above property, and a continuous casting nozzle using the refractory material for the intermediate layer.

It is yet another object of the present invention to provide a continuous casting nozzle using a refractory material (mortar) for an intermediate layer, which is suitable in case where an MgO—CaO based material is used for an inner bore-side layer thereof.

Means for Solving the Problem

In order to achieve the above objects, the present invention is characterized by the following features (1) to (9).

(1) A refractory material for an intermediate layer of a continuous casting nozzle, which contains a hollow refractory aggregate in an amount of 10 to 75 volume %, wherein a ratio of an average radius R of each particle of the hollow refractory aggregate to an average wall thickness t of the particle satisfies the following relation: $R/t \geqq 10$ (the appended claim 1).

(2) In the refractory material set forth in the appended claim 1, the hollow refractory aggregate has a glassy structure which contains $SiO_2$ in an amount of 70 mass % or more, and an alkali metal oxide and an alkaline earth metal oxide in a total amount of 1 to 10 mass % (the appended claim 2).

(3) The refractory material set forth in the appended claim 1 or 2, which contains, as a percentage with respect to a total amount of the remainder after excluding the hollow refractory aggregate, one or more selected from the group consisting of Al, Si, Mg and an alloy comprising any combination of two or more thereof, in a total amount of 0.5 to 15 mass % in terms of only a content of the metals, and carbon in an amount of 2 to 99.5 mass % (the appended claim 3).

(4) The refractory material set forth in any one of the appended claims 1 to 3, which has a compressive rate of 10 to 80% as measured under a pressure of 2.5 MPa (the appended claim 4).

(5) The refractory material set forth in any one of the appended claims 1 to 4, which has a bonding strength of 0.01 to 1.5 MPa with respect to other refractory material for the continuous casting nozzle, as measured under a hot condition in a non-oxidation atmosphere at a temperature of 1000 to 1500° C. (the appended claim 5).

(6) A continuous casting nozzle which comprises a tubular refractory structure having an inner bore formed along an axial direction thereof to allow molten metal to pass therethrough, and including an inner bore-side layer disposed to define the inner bore and an outer periphery-side layer disposed radially outward of the inner bore-side layer, wherein, in a part or entirety of the tubular refractory structure, a refractory material of the inner bore-side layer has a thermal expansion greater than that of a refractory material of the outer periphery-side layer. The continuous casting nozzle is characterized in that the inner bore-side layer and the outer periphery-side layer are mutually independent shaped bodies, wherein a first one of the shaped bodies serving as the inner bore-side layer is fixed to the other, second, shaped body serving as the outer periphery-side layer through an intermediate layer having compressibility, and wherein: a bonding strength between the intermediate layer and each of the first shaped body serving as the inner bore-side layer and the second shaped body serving as the outer periphery-side layer is in the range of 0.01 to 1.5 MPa, as measured under a hot condition in a non-oxidation atmosphere at a temperature of 1000 to 1500° C.; and the intermediate layer has a compressive rate K (%) satisfying the following Formula 1: $K \geqq (Di \times \alpha i - Do \times \alpha o)/(2 \times Tm)$, wherein:

Di is an outer diameter (mm) of the inner bore-side layer; Do is an inner diameter (mm) of the outer periphery-side layer; Tm is an initial thickness (mm) of the intermediate layer at room temperature; $\alpha i$ is a maximum thermal expansion coefficient (%) of the refractory material of the inner bore-side layer in a temperature range of room temperature to 1500° C.; and $\alpha o$ is a thermal expansion coefficient (%) of the refractory material of the outer periphery-side layer at a temperature in an initial stage of passing of molten steel through the continuous casting nozzle (the appended claim 6).

(7) In the continuous casting nozzle set forth in the appended claim 6, the intermediate layer is made of the refractory material set forth in any one of the appended claims 1 to 5 (the appended claim 7).

(8) In the continuous casting nozzle set forth in the appended claim 6, the intermediate layer contains a hollow refractory aggregate in an amount of 10 to 75 volume %, wherein a ratio of an average radius R of each particle of the hollow refractory aggregate to an average wall thickness t of the particle satisfies the following relation: R/t≧10. The intermediate layer further contains, as a percentage with respect to a total amount of the remainder after excluding the hollow refractory aggregate, one or more selected from the group consisting of Al, Mg, Si and an alloy comprising any combination of two or more thereof, in a total amount of 0.5 to 15 mass % in terms of only a content of the metals, and carbon in an amount of 2 to 99.5 mass %. The inner bore-side layer contains a CaO composition and an MgO composition in a total amount of 80 mass % or more, wherein a mass ratio of CaO to MgO (CaO/MgO) is in the range of 0.2 to 1.5. Further, a value derived by dividing a mass ratio of CaO contained in the inner bore-side layer to the entire inner bore-side layer by a mass ratio of a total of $Al_2O_3$, $SiO_2$ and an alkali metal oxide contained in the intermediate layer to the entire intermediate layer is 10 or more (the appended claim 8).

(9) In the continuous casting nozzle set forth in the appended claim 8, the hollow refractory aggregate in the refractory material of the intermediate layer has a glassy structure which contains $SiO_2$ in an amount of 70 mass % or more, and an alkali metal oxide and an alkaline earth metal oxide in a total amount of 1 to 10 mass % (the appended claim 9).

The above features of the present invention will be specifically described below.

Breaking of a continuous casting nozzle due to cracking or expansion splitting of an outer periphery-side layer caused by an inner bore-side layer becomes more prominent when the inner bore-side layer has a thermal expansion greater than that of the outer periphery-side layer, particularly, when a refractory material of the inner bore-side layer has a thermal expansion characteristic value (in the present invention, the term "thermal expansion characteristic value" is used synonymously with a linear expansion coefficient according to temperature rise) greater than that of a refractory material of the outer periphery-side layer.

In a continuous casting nozzle (placed in a vertically standing posture), a thermal expansion force of an inner bore-side layer is applied to an outer periphery-side layer, as a compression stress oriented in a radial direction in a horizontal cross-section of the continuous casting nozzle. Further, in a continuous casting nozzle having a structure where an outer periphery-side layer extends to cover a longitudinal or axial end thereof, a thermal expansion force of an inner bore-side layer is also applied to the outer periphery-side layer, as a compression stress oriented in an axial direction of the continuous casting nozzle. Then, the radial compression stress and the axial compression stress are converted, respectively, to a tensile stress oriented in a circumferential direction and a tensile stress oriented in the axial direction, within the outer peripheral-side layer. Subsequently, when these tensile stresses become greater than a tensile strength of the outer periphery-side layer, the circumferential tensile stress and the axial tensile stress will cause an axial (vertical) crack and a horizontal (transverse) crack, respectively, to damage the outer periphery-side layer.

In the present invention, as means to relax such a stress, an intermediate layer having compressibility after completion of preheating and at least in an initial stage of passing of molten steel (in the present invention, the term "an initial stage of passing of molten steel" is used synonymously with an initial stage of casting through an immersion nozzle or an initial stage of pouring of molten steel into a tundish through a long nozzle) is installed between the inner bore-side and outer periphery-side layers having the above relationship.

Thus, the thermal expansion force of the inner bore-side layer is applied to the intermediate layer without being directly applied to the outer periphery-side layer. During this process, the intermediate layer itself is reduced in thickness in the radial or axial direction, i.e., reduced in volume, in response to the compression stress, so that a stress to be caused by thermal expansion of the inner bore-side layer can be relaxed. In the present invention, such a capability to be reduced in thickness and volume is referred to as "compressibility".

A target range of compressibility to be obtained by the intermediate layer will be described below.

Generally, in a refractory member made primarily of an $Al_2O_3$—C based material which is a typical material for an outer periphery-side layer of a conventional immersion nozzle, the outer periphery-side layer is broken when a pressure of several MPa is imposed on an inner wall surface thereof. For example, in a refractory member which comprises an outer periphery-side layer made of an $Al_2O_3$-graphite based material to have a maximum tensile strength of 6 MPa, and has a configuration of a typical continuous casting nozzle, i.e., a cylindrical shape and practically minimum radial dimensions (the outer periphery-side layer has an inner diameter φ of 80 mm and an outer diameter φ of 135 mm), when a pressure is imposed from the side of an inner wall surface of the refractory member, the outer periphery-side layer will reach breaking at a time when the pressure imposed on the inner wall surface is increased to about 2.5 MPa, according to calculation using a formula for a thick-walled cylinder.

In a continuous casting nozzle where an intermediate and an inner bore-side layer are disposed on the side of an inner bore thereof relative to the above outer periphery-side layer, as a prerequisite to relaxing a stress to be applied to the outer periphery-side layer due to thermal expansion of the inner bore-side layer, the intermediate layer itself needs to exhibit a deformation behavior in an initial stage of and during a course of preheating and casting. Specifically, it is necessary that a stress to be applied from the inner bore-side layer to the outer periphery-side layer is reduced to 2.5 MPa or less.

For the above reason, a tensile stress to be generated in the outer periphery-side layer during a course of heating of the inner bore-side layer and passing of molten steel through the inner bore-side layer is preferably reduced to 2.5 MPa or less, more preferably minimized to further enhance safety. The intermediate layer itself needs to exhibit a deformation behavior capable of reducing a compression stress to a value corresponding to such a tensile stress value.

Compressibility required for the intermediate layer can be expressed as a compressive rate K (%) in the following Formula 1: $K \geq (Di \times \alpha i - Do \times \alpha o)/(2 \times Tm)$, wherein: Di is an outer diameter (mm) of the inner bore-side layer; Do is an inner diameter (mm) of the outer periphery-side layer; Tm is a thickness (initial thickness) (mm) of the intermediate layer at room temperature; αi is a maximum thermal expansion coefficient (%) of a refractory material of the inner bore-side layer in a temperature range of room temperature to 1500° C.; and αo is a thermal expansion coefficient (%) of a refractory material of the outer periphery-side layer at a temperature in an initial stage of passing of molten steel through the continuous casting nozzle.

Di and Do are, respectively, a diameter measured on an outer periphery-side surface of the inner bore-side layer and a diameter measured on an inner bore-side surface of the outer periphery-side layer, in respective horizontal cross-sections (i.e., cross-sections taken along a direction perpendicular to the axial direction) of the inner bore-side layer and the outer periphery-side layer. When a horizontal cross-sectional shape of each of the inner bore-side layer and the outer periphery-side layer is not circle, Di may be defined as a distance between two positions where a straight line extending radially from a center of the horizontal cross-sectional shape of the inner bore-side layer intersects with the outer periphery-side surface of the inner bore-side layer, and Do may be defined as a distance between two positions where the above straight line intersects with the inner bore-side surface of the outer periphery-side layer. Then, the entire dimensions may be determined to satisfy the Formula 1.

In regard to compressibility in an axial end of the intermediate layer, Di may be replaced with an axial distance between respective opposite axially outward end surfaces of the inner bore-side layer, and Do may be replaced with an axial distance between respective opposite axially inward surfaces of the outer periphery-side layer each facing a corresponding one of the axially outward end surfaces of the inner bore-side layer, in respective vertical cross-sections of the inner bore-side layer and the outer periphery-side layer, taken along a longitudinal (vertical) axis of the continuous casting nozzle (a line passing through respective centers of a plurality of horizontal cross-sections of the continuous casting nozzle placed in a vertically standing posture).

In the Formula 1, $\alpha i$ is a maximum thermal expansion coefficient (%) of the refractory material of the inner bore-side layer in a temperature range of room temperature to 1500° C., which means that $\alpha i$ is a maximum thermal expansion coefficient of the refractory material of the inner bore-side layer in a temperature range of room temperature to substantially a temperature of molten steel. Further, $\alpha o$ is a thermal expansion coefficient (%) of the refractory material of the outer periphery-side layer at a temperature in an initial stage of passing of molten steel, wherein the temperature to which the outer periphery-side layer is exposed in the initial stage of passing of molten steel varies depending on conditions of casting operation, such as a preheating condition. Thus, $\alpha o$ is determined for each job site on a case-by-case basis. The thermal expansion coefficient according to temperature rise may be measured based on JIS R2207-1 or a method conforming thereto (essentially, in a non-oxidation atmosphere).

In case where the continuous casting nozzle is used without preheating, a temperature of the outer periphery-side layer is equal to room temperature (ambient temperature). In this case, $\alpha o$ may be considered as a thermal expansion coefficient at room temperature which is a reference point of the measurement of thermal expansion coefficient, i.e., "zero", and therefore the Formula 1 can be expressed as the following Formula 2: $K \geq (Di \times \alpha i)/(2 \times Tm)$ The compressive rate K satisfying the Formula 2 is a value for coping with the most severe condition, i.e., a condition that a difference in thermal expansion between the inner bore-side and outer periphery-side layers becomes maximized. Thus, as long as the compressive rate K is equal to or greater than a value satisfying the Formula 2, the outer periphery-side layer will never be broken. Preferably, the compressive rate K is set to a value satisfying the Formula 2 in all the operating conditions to more reliably prevent breaking so as to ensure safety.

The compressive rate K in the Formulas 1 and 2 is measured under a condition that a target refractory member (sample) is not oxidized, for example, a condition that the target refractory member is placed in a non-oxidation atmosphere such as a reducing gas atmosphere or an inert gas atmosphere, or a condition that the target refractory member is placed in an oxidizing gas atmosphere such as an air atmosphere after an antioxidant is applied onto a surface of the target refractory member. During actual use of the continuous casting nozzle, the intermediate layer is placed in a non-oxidation atmosphere (If the target sample is oxidized during measurement of the compressive rate K, properties of the sample cannot be accurately figured out.

Preferably, in the present invention, the compressive rate K of a refractory material for the intermediate layer is fundamentally set in the range of 10 to 80%.

A thickness of the intermediate layer can be adjusted depending on the compressive rate of the intermediate layer to absorb expanded dimensions of the inner bore-side layer. If the compressive rate is less than 10%, the thickness of the intermediate layer has to be increased in view of a difference in thermal expansion coefficient between the inner bore-side and outer periphery-side layers. Thus, due to restrictions on an overall wall thickness of the continuous casting nozzle, a wall thickness of a nozzle body of the continuous casting nozzle is inevitably reduced to cause a problem in structural strength. If the compressive rate is greater than 80%, the above problem is less likely to occur, because the intermediate layer can be designed to have a small thickness. However, such a thin intermediate layer is likely to cause a production problem in formation thereof and a problem of deterioration in bonding strength between the inner bore-side and outer periphery-side layers. For example, on an assumption that the outer periphery-side layer has an inner diameter of about 80 mm $\phi$ which is close to the smallest size in commonly-used continuous casting nozzles, and thermal expansion coefficients of the inner bore-side layer and the outer periphery-side layer are 2.0% and 0.8%, respectively, the thickness of the intermediate layer is about 4 mm, and the compressive rate required for the refractory material of the intermediate layer is 10%. Further, on an assumption that the outer periphery-side layer has an inner diameter of about 150 mm $\phi$ which is close to the largest size in the commonly-used continuous casting nozzles, and thermal expansion coefficients of the inner bore-side layer and the outer periphery-side layer are 2.0% and 0.8%, respectively, the thickness of the intermediate layer is about 1.2 mm, and the compressive rate required for the refractory material of the intermediate layer is about 78%.

The compressibility of the refractory material for the intermediate layer is primarily obtained by a hollow refractory aggregate which is one component of the refractory material.

The phenomenon that the hollow refractory aggregate provides compressibility to relax a stress due to thermal expansion is primarily based on the following two mechanisms.

(1) Due to thermal expansion of the inner bore-side layer, the hollow refractory aggregate is compressed by a stress equal to or greater than a breaking strength thereof, to cause breaking of a wall of the hollow refractory aggregate and a reduction in volume of the hollow refractory aggregate, and a spacial volume resulting from the breaking serves as a volume (dimensions) for absorbing the thermal expansion of the inner bore-side layer. This process primarily occurs when each particle of the hollow refractory aggregate receives a load before softening thereof.

(2) In a high-temperature region of greater than 1000° C., the walls of the hollow refractory aggregate are softened (a level of the softening depends on temperature), and the softened hollow refractory aggregate is easily deformed by a pressure to cause a reduction in volume, and a spacial volume resulting from the softening/deformation and the volume shrinkage serves as a volume (dimensions) for absorbing the thermal expansion of the inner bore-side layer.

An actual compressive rate measured at 1000° C. and an actual compressive rate measured at 1500° C. (in a non-oxidation atmosphere) may be fundamentally used as a lower limit value and an upper limit value of the compressive rate, respectively. The actual compressive rate measured at 1000° C. can be used as the lower limit value of the compressive rate by the following reasons. At 1000° C., the compressibility of the refractory material containing the hollow refractory aggregate is almost provided by breaking of the hollow refractory aggregate (strictly, there is also a certain level of compressibility of a matrix structure of the refractory material), wherein this breaking characteristic is almost not changed in a temperature range of room temperature to about 1000° C., and a volatile material in a binder is sufficiently released to complete a carbon-based binding structure, i.e., form a binding structure as the basis of the refractory matrix, so that the actual compressive rate measured at 1000° C. would substantially indicate the lower limit value of the compressive rate, and thereby the lower limit value can be evaluate with less variation. Further, in the high-temperature range of 1000 to 1500° C. (temperature of molten steel), the softening characteristic of the hollow refractory aggregate is exhibited in addition to the breaking of the hollow refractory aggregate, so that the actual compressive rate tends to be increased relative to that measured at 1000° C. The reason why the actual compressive rate measured at 1500° C. can be used as the upper limit value of the compressive rate is that the intermediate layer has a temperature of about 1500° C. when a surface of the inner bore has a maximum temperature which is the temperature of molten steel.

The compressive rate in the present invention can be measured by the following method, and a resulting measured value can be regarded as the compressive rate.

A columnar refractory member (20 mm $\phi \times 5$ mm t) made of a mixture having a characteristic of exhibiting compressibility after being formed under a pressure equal to a shaping pressure and subjected to a heat treatment is put in a holding cavity of a carbon-based member having the same shape as that of the columnar refractory member, and then subjected to a heat treatment under a non-oxidation atmosphere in a given temperature rise pattern to allow a burnable component to be vanished so as to obtain a columnar sample (about 20 mm $\phi \times$ about 5 mm t) This heat-treated columnar sample is disposed between respective end surfaces of two refractory jigs each having a size of 20 mm $\phi \times 40$ mm L. Further, a cylindrical sample guide made of a refractory material and formed to have an inner diameter 20 mm $\phi$, an outer diameter of 50 mm $\phi$ and a height dimension of 78 mm is fitted on the sample in order to prevent the sample from dropping off laterally during an operation of longitudinally pressing the columnar sample clamped between the jigs, to obtain a measurement sample. In an operation of measuring a compressive rate of mortar containing a solvent, the solvent is likely to intrude into open pores in an end surface of a refractory test piece to change the compressive rate. Thus, it is preferable that the refractory test piece is pre-impregnated with a solvent or subjected to a wax treatment to form an intrusion/penetration-resistant refractory test piece.

The measurement sample is set inside a furnace of a material testing machine capable of controlling a temperature, an atmosphere and a pressing speed. Then, after increasing a furnace temperature up to a given value in a non-oxidation atmosphere, and holding the temperature until it is uniformed, a pressing operation is initiated to carry out the measurement. Specifically, an initial thickness t0 (mm) of the cylindrical measurement sample is firstly measured under a pressureless condition. After holding a temperature of the measurement sample at a given value, the measurement sample is compressed from upward and downward directions while setting a crosshead moving speed in the range of 0.001 to 0.01 mm/sec, in such a manner as to increase a pressing force up to 2.5 MPa, and then a displacement (i.e., deformation amount) h1 (mm) of the measurement sample is measured. Further, in order to measure a blank value at the same temperature and under a load equal to that of the refractory jigs for clamping the measurement sample, the cylindrical measurement sample is pressed under the same conditions, except that it is unclamped, to measure a displacement h2. These measured values can be assigned to the following Formula 3 to calculate the compressive rate K (%) at each temperature:

$$K=(h1-h2)/t0\times 100(\%).$$

The compressive rate can also be measured from an actual casting nozzle having a structure where an inner bore-side layer is continuously integrated with an outer periphery-side layer through an intermediate layer during a forming process. Specifically, the actual casting nozzle is subjected to core boring of 20 mm $\phi$ from the outer periphery-side layer toward an axis of the refractory nozzle in a direction perpendicular to the axis, to obtain a core sample integrally including respective portions of the inner bore-side layer, the intermediate layer and the outer periphery-side layer, and having a diameter of about 20 mm $\phi$ and a curvature in an inner bore surface and an outer peripheral surface thereof In order to uniformly compress the core sample, the core sample is bonded to two refractory jigs after flatly machining each of top and bottom surfaces of the core sample, or bonded to two refractory jigs each having the same curvature as that of a corresponding one of the top and bottom surfaces of the core sample, to obtain a measurement sample including the inner bore-side layer, the intermediate layer and the outer periphery-side layer and having a size of 20 mm $\phi \times 80$ to 100 mm L (if the measurement sample is smaller than this size, the measurement may be performed under a condition that parameter values, such as a unit area and a unit length, are set at the same level as those in the above measurement sample on a calculation basis, and then a measured value may be subjected to conversion). Then, in the same manner as that in the above method, the initial thickness t0 (mm) of the intermediate layer is accurately measured under a pressureless condition. Further, the displacement h1 of the intermediate layer is measured in a non-oxidation atmosphere, and the displacement h2 as a blank value in a state devoid of the intermediate layer is measured, so as to calculate the compressive rate K. The measurement sample obtained from the actual nozzle makes it possible to accurately measure the compressibility of the intermediate layer.

Compressibility for stress relaxation in the present invention can be obtained by the hollow refractory aggregate in the intermediate layer, as mentioned above. A level of the compressibility approximately corresponds to a volume percentage of the hollow refractory aggregate in the refractory material of the intermediate layer. Specifically, when the intermediate layer contains the hollow refractory aggregate in an amount of 10 to 75 volume %, a requirement that a compressive rate at 1000° C. is in the range of 10 to 80% can be satisfied. A portion of the matrix of the intermediate layer other than the hollow refractory aggregate also has a certain level of compressibility. However, the hollow refractory aggregate contained in the intermediate layer in an amount of 10 to 75 volume % makes it possible to stably obtain compressibility in design without relying on a level of compressibility of the remaining matrix portion.

In the present invention, the term "volume % of the hollow refractory aggregate" means a percentage of a value derived by dividing a volume calculated from an average particle density and a weight of the added hollow refractory aggregate (i.e., a volume of the hollow refractory aggregate itself, a volume of closed pores in the hollow refractory aggregate, and a volume of spaces of concave-convex portions in a surface of the hollow refractory aggregate) by a sum of a volume occupied by the hollow refractory aggregate and a volume occupied by the remaining matrix portion. The volume percent of the hollow refractory aggregate can be most accurately obtained by a calculation method based on respective densities of raw materials used in a mixture. Alternatively, a value of a volume fraction of the hollow refractory aggregate obtained by image analysis, such as a line segment method, based on two-dimensional information about the hollow refractory aggregate from a microstructure photograph, may be used.

In an operation of preparing the mixture, a volume in a state after the hollow refractory aggregate and the remaining matrix portion are filled in a container.

The hollow refractory aggregate for use in the present invention internally has a void and a cell formed by a wall. In regard to a compression strength of the hollow refractory aggregate, it is preferable that, under a temperature of less than 1000° C., each particle of the hollow refractory aggregate is broken by a predetermined maximum pressure as a prerequisite for a continuous casting nozzle, i.e., a compression stress of 2.5 MPa or less, when it is compressed between two flat surfaces (an evaluation may be performed under room temperature, because the compression strength is almost not changed in a temperature range of room temperature to less than 1000° C.).

As a prerequisite to meeting the requirement for the compression strength, a ratio (R/t) of an average radius R of each particle of the hollow refractory aggregate to an average wall thickness t of each particle of the hollow refractory aggregate is required to be 10 or more. If the ratio R/t is less than 10, a breaking rate under a pressure of 2.5 MPa becomes excessively reduced, which is likely to cause difficulty in ensuring a required compressive rate.

More preferably, the ratio R/t is 60 or less. If the ratio R/t is greater than 60, the hollow refractory aggregate is highly likely to be broken by a mechanical shock during setup of the intermediate layer of the present invention, handling of a continuous casting nozzle having the intermediate layer installed therein, etc., to spoil stability of the intermediate layer.

In the present invention, the term "average radius" means, for example, a simple mean value of a maximum radius and a minimum radius, or a weighted mean value of radii at a plurality of arbitrary points, in projection plane or cross-section in a vicinity of a center of each particle of the hollow refractory aggregate.

Preferably, a size (average radius R of each particle) of the hollow refractory aggregate meeting the requirement for the ratio R/t is minimized in view of allowing the hollow refractory aggregate particles to be evenly dispersed in the intermediate layer so as to exhibit uniform compressive behavior in the intermediate layer. An upper limit of the size of the hollow refractory aggregate is a relative value depending on a thickness of a layer of the refractory material to be installed, a method for the installation (setup), etc. Therefore, it is inadequate to specify the upper limit by an absolute value. However, considering a thickness of the intermediate layer based on an industrially realistic size of a continuous casting nozzle using the refractory material of the present invention, a lower limit of the thickness of the intermediate layer is about 1 mm (typically, about several mm, in view of quality, working efficiency during installation, a rational structure of the continuous casting nozzle, etc.; the upper limit varies over a wide range due to a factor of the compressive rate, etc.). As the average radius of each particle of the hollow refractory aggregate becomes larger, it becomes harder to allow the hollow refractory aggregate particles to be evenly dispersed in the layer having such a thickness. For example, in an operation of filling the refractory material for the intermediate layer between the inner bore-side and outer periphery-side layers (by a filling technique, such as the same technique as that for joint mortar, or pouring), large hollow refractory aggregate particles are liable to exhibit separation and segregation even in an early stage of setup of the refractory material. Moreover, as the average radius R becomes larger, the hollow refractory aggregate particle becomes more breakable. These cause a variation of compressibility in each region of the intermediate layer. For the above reasons, it is preferable that a maximum radius of the hollow refractory aggregate particle is 250 μm or less.

Further, it is preferable that a minimum radius of the hollow refractory aggregate particle is 2.5 μm or more. If the minimum radius is less than 2.5 μm, a compression strength of the hollow refractory aggregate particle tends to be increased to increase a rate of unbroken particles under a compression stress of 2.5 MPa or less to cause an undesirable tendency toward a reduction in compressable amount, although it is desirable in terms of uniformity.

In the present invention, the term "maximum radius" means a radius of the hollow refractory aggregate particle which is capable of passing through a sieve having a mesh size (length of one side of a square mesh) equal to a diameter of a particle having a reference radius, or sorted by a method equivalent thereto, and the term "minimum radius" means a radius of the hollow refractory aggregate particle which is incapable of passing through the sieve having the mesh size equal to the diameter of the particle having the reference radius, or sorted by a method equivalent thereto.

Preferably, the shell of the hollow refractory aggregate particle has a spherical shape or a rounded shape. The spherical or rounded-shaped hollow refractory aggregate particles can be brought into point contact with each other to increase a possibility that respective walls of the hollow refractory aggregate particles are broken by a relatively small stress (e.g., 2.5 MPa or less) with less variation, i.e., can stably obtain a desired compression strength, as compared with a case where a contact portion has a relatively large surface area. In addition, when the intermediate layer in mortar form is filled in (or applied to) and disposed in a gap between an inner bore-side layer and an outer periphery-side layer (nozzle body of a continuous casting nozzle), fluidity of the intermediate layer within the gap can be improved to eliminate a need for excessively using a solution, while suppressing segregation. In case where a solution containing a large amount of volatile material for imparting fluidity required for obtaining working efficiency during filling is used in large amounts, a bonding capability and a structural strength of the refractory material of the intermediate layer are likely to deteriorate.

A hollow refractory aggregate comprises a vitreous (glassy) material known as "glass balloon", "silica balloon" or "Shiras balloon", is particularly preferably used as the above hollow refractory aggregate. Preferably, the vitreous material-containing hollow refractory aggregate has a glassy structure which contains, as a chemical composition, $SiO_2$ in an amount of 70 mass % or more, and an alkali metal oxide and an alkaline earth metal oxide in a total amount of 1 to 10 mass %, with the remainder (after excluding the $SiO_2$, the alkali metal oxide and the alkaline earth metal oxide) being a neutral oxide and/or an acidic oxide other than $SiO_2$. Specifically, the remainder is most preferably an aluminosilicate-based material comprising $Al_2O_3$.

The above composition, particularly, with the remainder being an aluminosilicate-based material comprising $Al_2O_3$, has a softening point of 1000 to 1400° C. (in the present invention, the term "softening" means a state in which a deformation (different from breaking) occurs in an outer shape under a pressure of 2.5 MPa or less), and facilitates softening/deformation of the intermediate layer in a high-temperature region to increase a compressable amount under a hot condition.

The hollow refractory aggregate exhibits compressibility based on brittle failure by a pressure of 2.5 MPa or less, in a low-temperature region of less than about 1000° C. before softening. Further, the hollow refractory aggregate includes the vitreous composition containing an alkali metal oxide and an alkaline earth metal oxide in a total amount of 1 to 10 mass %. This facilitates softening/deformation of the hollow refractory aggregate in a high-temperature range of about 1000 to 1500° C. (temperature of molten steel) to allow the hollow refractory aggregate to be reduced in volume so as to contribute to realization of a stress absorption capability and a hot strength.

If the amount of $SiO_2$ is less than 70 mass % and the total amount of an alkali metal oxide and an alkaline earth metal oxide is greater than 10 mass %, or if the amount of $SiO_2$ is 70 mass % or more and the total amount of an alkali metal oxide and an alkaline earth metal oxide is greater than 10 mass %, viscosity of molten glass is likely to cause a problem in preparing a hollow raw material, and low high-temperature viscosity is likely to cause a problem in a bonding force for holding the inner bore-side layer. Further, if the amount of $SiO_2$ is less than 70 mass % and the total amount of an alkali metal oxide and an alkaline earth metal oxide is less than 1 mass %, or if the amount of $SiO_2$ is 70 mass % or more and the total amount of an alkali metal oxide and an alkaline earth metal oxide is less than 1 mass %, the vitreous composition tends to have an excessively high viscosity to cause a problem in preparing a hollow raw material and a problem of deterioration in softening/deformation behavior and in adhesive force for holding the inner bore-side layer, in a high-temperature region.

In specifying a composition of the hollow refractory aggregate in the present invention, a volatile material and a combustible material in a non-oxidation atmosphere are not included therein. Specifically, the composition is specified based on a sample after a heat treatment in a non-oxidation atmosphere at about 600° C. or more.

Before the hollow refractory aggregate is reduced in volume through softening and breaking by stress, it exists in the refractory composition as an aggregate having a volume. Thus, the hollow refractory aggregate allows the intermediate layer to exhibit and maintain a higher structural strength and a higher stress distribution capability, while significantly reducing intrusion or penetration of extraneous fluid, such as molten metal or air, as compared, for example, with a conventional mortar initially having a void therein. Therefore, the hollow refractory aggregate can also contribute to stability of the intermediate layer itself, stability of a layer structure of the continuous casting nozzle, etc., as described later.

The intermediate layer is required to have an ability to prevent displacement, peel-off, breaking, etc., of the inner bore-side layer, even if the inner bore-side layer receives an external force in various stages of transport, installation, pre-heating, and passing of molten steel of the continuous casting nozzle.

In a mortar having a large volume of void simply formed in a refractory matrix structure, the structure is broken after shrinkage to cause embrittlement of the intermediate layer itself and deterioration in bonding strength, resulting in breakup of the intermediate layer itself. Consequently, it leads to a significant high risk of causing peel-off and breaking of the inner bore-side layer, intrusion of molten steel, etc., between the inner bore-side and outer periphery-side layers, etc.

It has been found that troubles related to the inner bore-side layer during casting operation are mostly caused by insufficiency in bonding capability of the intermediate layer. Thus, in case where the intermediate layer is required to have a high bonding capability, it is necessary to allow the inner bore-side layer to be stably bonded to the outer periphery-side layer during passing of molten steel at high temperatures, while maintain a given structural strength through the intermediate layer, particularly, after the intermediate layer is compressed by thermal expansion of the inner bore-side layer.

As mentioned above, the compressibility of the refractory material of the intermediate layer of the present invention is primarily achieved by breaking/deformation of the hollow refractory aggregate, and therefore a matrix structure has a higher strength and a higher density as compared with the conventional mortar. Thus, deterioration in structural embrittlement (deterioration in breaking strength) and deterioration in bonding strength are significantly suppressed.

Further, when a given stress is applied to the refractory structure of the intermediate layer, only a part of the hollow refractory aggregate necessary for compressibility is broken, or the hollow refractory aggregate is softened and deformed under a hot condition in a non-oxidation atmosphere at a temperature of 1000 to 1500° C. (temperature of molten steel), to relax the stress to prevent breaking or the like of the continuous casting nozzle. Simultaneously, the remaining part of the hollow refractory aggregate unnecessary for compressibility maintains a shape thereof to serve as a backbone of the refractory material of the intermediate layer.

During breaking or softening/deformation of the hollow refractory aggregate, only a part of the shells of the hollow refractory aggregate particles receiving a compression stress, for example, from a matrix portion therearound, are reduced in volume in such a manner that shell walls of the hollow refractory aggregate particles are broken or deformed toward respective insides of the hollow refractory aggregate particles. The hollow refractory aggregate particles are dispersed in the matrix structure. Thus, the breaking or softening/deformation of the hollow refractory aggregate never causes a large local deformation in the matrix structure or breaking of the matrix structure at a level precluding a possibility to maintain shape retainability which would otherwise occur in the conventional high-porosity mortal.

Accordingly, the hollow refractory aggregate can exist while being in close contact with a portion of the matrix structure therearound, i.e., without forming a void in the portion of the matrix structure therearound, and maintaining a configuration as an aggregate in an unbroken refractory structure. Thus, the intermediate layer can maintain a strong and dense structure while almost preventing a formation of pores and voids in a contact surface between the inner bore-side and outer periphery-side layers, and stably maintain bond between the inner bore-side and outer periphery-side layers while receiving an external force by expansion of the inner bore-side layer.

However, it is desirable to more positively impart a bonding capability to a contact surface between the intermediate layer and each of the inner bore-side and outer periphery-side layers.

Therefore, in the present invention, a formation of a product, such as carbide, through a reaction of a metal at high temperatures, is used as a means to enhance the bonding capability of the intermediate layer. Specifically, the refractory material for the intermediate layer of the present invention contains, as a percentage with respect to a total amount of the remainder after excluding the hollow refractory aggregate contained in an amount of 10 to 75 volume %, one or more (hereinafter referred to collectively as "specific metal") selected from the group consisting of Al, Si, Mg and an alloy comprising any combination of two or more thereof, in a total amount of 0.5 to 15 mass % in terms of only a content of the metals, and carbon in an amount of 2 to 99.5 mass %. In specifying a composition of the hollow refractory aggregate in the present invention, a volatile material and a combustible material in a non-oxidation atmosphere are not included therein. Specifically, the composition is specified based on a sample after a heat treatment in a non-oxidation atmosphere at a temperature of about 600 to 800° C.

As above, the specific metal and carbon coexist in the remainder in a dispersed manner. This makes it possible to enhance a bonding strength of the intermediate layer and a binding strength of the refractory structure itself under a hot condition at a temperature of about 800° C. or more, particularly about 1000° C. or more, in cooperation with carbon bond derived from a resin or the like generally for use in binding between components of a refractory material and ensuring shape retainability.

This function is considered as follows. Through coexistence with carbon, the specific metal is exposed to a reduction atmosphere during casting operation. Thus, the specific metal is vaporized as Mg-based gas and/or Al-based gas, and a part of the vaporized gas is deposited and bonded (hereinafter referred to simply as "deposited") to pores or other portion in the refractory structure where a partial pressure of oxygen would be relatively high, in the form of metal carbide and/or metal oxide. The oxide of the specific metal is also deposited concentratedly on a portion other than the pores formed inside the refractory material, such as a portion adjacent to the refractory material, particularly, pores and voids adjacent to a contact interface between the intermediate layer and molten steel containing oxygen components.

A structural strength and bonding capability of the refractory material of the intermediate layer at a temperature less than about 800° C. are primarily provided by the carbon bond derived from resin or the like. At a high temperature of about 800° C. or more, particularly about 1000° C. or more, a binding structure based on a carbide created by a reaction between the specific metal and carbon, an oxide created by the deposit, etc., is added to the carbon bond derived from resin or the like, etc., to enhance bindability.

In the above manner, an internal strength of the refractory structure of the intermediate layer is enhanced, and a bonding force between the inner bore-side layer and the outer periphery-side layer is enhanced. In addition, a significant effect of preventing intrusion/penetration of molten steel and other foreign substances into the intermediate layer is obtained (the binding structure based on the deposit will hereinafter be also referred to as "re-binding structure").

In the refractory material of the present invention, even if the hollow refractory aggregate is broken or deformed and reduced in volume, a portion of a matrix structure other than the hollow refractory aggregate is not largely damaged. Further, even if damage occurs in a part of the binding structure and the matrix structure, the re-binding structure is formed to contribute to reproducing or reinforcing the binding structure for the matrix of the intermediate layer, and enhancing the bonding strength between the inner bore-side and outer periphery-side layers. Consequently, the bonding strength is enhanced without deterioration at a high temperature of about 1000° C. or more.

In the present invention, the above advantageous effects of the hollow refractory aggregate, the specific metal and the carbon are absolutely different from those of the conventional techniques, such as a mortal-based technique, where a large volume or size of void exists from a time before initiation of receiving of molten steel, and only binding derived from resin or the like is exhibited in an initial stage of passing of molten steel, whereafter structural compression and breaking are promoted.

The bonding capability can be quantitatively expressed by bonding strength, as follows. Preferably, with respect to each of the inner bore-side layer and the outer periphery-side layer, the intermediate layer has a bonding strength of 0.01 to 1.5 MPa, as measured under a hot condition in a non-oxidation atmosphere at a temperature of 1000 to 1500° C. (temperature of molten steel). As a prerequisite to having the bonding strength, it is understood that the intermediate layer itself has a structural strength equal to or greater than the bonding strength. Thus, the following description will be made about only the bonding strength.

If the bonding strength is less than 0.01 MPa, an ability to holding the inner bore-side layer becomes lower, which is likely to cause peel-off of the inner bore-side layer, due to shock at start of passing of molten steel or a change in flow rate of molten steel, or when a local melting loss occurs in the inner bore-side layer. If the bonding strength is greater than 1.5 MPa, a strength of an internal structure of the intermediate layer is also increased to the same level as that of the bonding strength to spoil compressibility of the intermediate layer. Thus, a thermal expansion force of the inner bore-side layer is likely to be transmitted to the outer periphery-side layer without being relaxed, and particularly likely to cause splitting or cracking of the outer periphery-side layer.

The bonding strength can be evaluated as a compression shear strength S. Specifically, as shown in FIG. 2, a tubular sample having a three-layer structure in which an inner bore-side layer 2 is provided inside an outer periphery-side layer 3(4) through an intermediate layer 1 is placed on a table 8, and evenly heated under a given hot condition for a given holding time. Then, a maximum load P(N) and a displacement of the inner bore-side layer are measured while pressing only a top surface of the inner bore-side layer by a crosshead 9 moved at a speed of 0.001 to 0.1 mm/sec, and the compression shear strength S is calculated according to the following Formula 4: $S(Pa)=P/A$, wherein A is a bonded area ($m^2$) of the inner bore-side layer to the intermediate layer.

A shape of the sample is not particularly limited as long as it is a tubular shape. The sample may be cut out from an actual nozzle, and subjected to the measurement. If the bonded area A is increased, the maximum load P is also increased. Thus, a maximum height dimension of the sample is preferably set to 100 mm The measurement is performed at a minimum temperature of 1000° C. and in a non-oxidation atmosphere. The reason is that 1000° C. corresponds to a temperature at which a volatile material in an organic binder is sufficiently released to complete a carbon-based binding structure so that stable compressibility and bonding capability are exhibited, and a temperature at which the reaction to deposit of the specific metal is initiated.

If the content of the specific metal in the remainder is greater than 15 mass %, the structural strength and the bonding capability of the intermediate layer are enhanced. On the other hand, the binding structure based on the metal carbide excessively increases the strength of the refractory structure of the intermediate layer, which is likely to spoil compressibility of the intermediate layer to cause difficulty in obtaining required compressibility. Moreover, the specific metal is melted during a course of temperature rise to cause a risk of flowing out from an original position in the matrix, which is likely to cause difficulty in uniformly obtaining the structural strength and the bonding force over the intermediate layer. This also leads to breakup of a part of the matrix structure and formation of an interlayer gap, and molten steel and other foreign substances are likely to intrude into a resulting void or the like. If the content of the specific metal in the remainder is less than 0.5 mass %, the effect of enhancing the structural strength of the intermediate layer and increasing the bonding strength in a non-oxidation atmosphere at 1000° C. to 0.01 MPa or more cannot be obtained, and segregation is likely to occur. Moreover, this is likely to lead to breaking or peel-off of the intermediate layer and intrusion of molten steel and other foreign substances.

The specific metal is limited to at least one of Al, Si and Mg for the following reason. In the specific metal, Al or Mg has a high affinity with oxygen, and an ability to capture oxygen to form a deposit excellent in corrosion resistance, such as $Al_2O_3$ or MgO. Further, Si reacts with carbon in the intermediate layer at a high-temperature region of about 1300° C. or more to form SiC excellent in corrosion resistance. Preferably, a purity of the specific metal is maximized in view of reactivity and dispersibility. However, as long as the reactivity is impaired, the purity of the specific metal may be lowered (any metal or alloy sold on the market (industrially produced and generally distributed) with a label indicating that a primary component consists of the specific metal).

Preferably, a particle size of the specific metal is minimized in view of reactivity and dispersibility. However, as the particle size becomes smaller, a handling risk becomes higher, and oxidation in air is more likely to occur. Thus, preferably, a lower limit and an upper limit of the particle size are set to about 5 µm, and about 300 µm, respectively. More preferably, the particle size is set to 20 µm or less, because, when the particle size is set to 20 µm or less, a surface area is sharply increased to provide enhanced reactivity and more enhanced dispersibility.

As a percentage with respect to a total amount of the remainder in the intermediate layer, a carbon component to be reacted with the specific metal is essentially contained in an amount of 15 to 99.5 mass %.

A carbon source may be: a thermosetting resin, such as a phenol resin which leaves carbon during heating-up; various types of pitches; carbon black; graphite and carbon fiber. A combination of two or more of these materials may also be used. Preferably, the carbon source contains: carbon having a minimized particle size, such as carbon black; or amorphous carbon derived from the binding structure (hereinafter referred to simply as "fine carbon") to enhance reactivity with the specific metal, and uniformity. Further, an organic adhesive or resin, such as polyvinyl acetate-based resin, epoxy resin, acrylic resin or polyester resin, may be used in order to impart structural strength in a temperature range of room temperature to about several hundred ° C.

Preferably, the matrix structure of the refractory material of the intermediate layer further contains a base material for forming a backbone of the continuous binding structure and the matrix structure, such as graphite or carbon fiber (hereinafter referred to simply as "backbone carbon"), in addition to the fine carbon providing fundamental structural strength and bonding force. In particular, graphite and carbon fiber are preferable, because graphite can provide a flexible and continuous three-dimensional structure by taking advantage of a layered crystal structure and a flat particle shape thereof, and carbon fiber can also provide the same three-dimensional structure.

The flexible and continuous three-dimensional structure can be formed in the matrix in the above manner In this case, toughness can also be imparted to the binding structure including carbide after reaction with the specific metal, to suppress breakup of a portion of the matrix therearound which would otherwise occur when the hollow refractory aggregate is deformed or broken by stress, so as to further enhance soundness as a layer.

In regard to a specific rate of the fine carbon and the backbone carbon, the backbone carbon, such as graphite or carbon fiber, having a large aspect ratio and an effect of enhancing three-dimensional continuity, is contained, as a percentage with respect to the total carbon amount of 15 to 99.5 mass %, in an amount of 70 to 95 mass %. If the content is less than 70 mass %, the three-dimensional continuity will deteriorate to cause a risk of spoiling flexibility. If the content is greater than 95 mass %, the bonding strength is limited to a low level to cause a risk of the occurrence of local breaking.

As a method of assistively accelerating the enhancement in corrosion resistance by the effect of the deposit of the specific metal on an operation surface based on the coexistence of the specific metal and carbon, there is a technique of incorporating a refractory raw material excellent in corrosion resistance as a component of the remainder in combination. However, in the case where a refractory raw material consisting of a component other than the hollow refractory aggregate is contained in a part of the remainder other than the specific metal and carbon (the refractory raw material will hereinafter be also referred to as "additional component"), it is necessary to select, as an additional component, a refractory aggregate comprising a primary component free of a low-temperature melting phenomenon and a volatilization/vanishment phenomenon at a casting temperature in relation to the inner bore-side layer and the outer periphery-side layer. If a liquid phase is created at the casting temperature due to contact with the inner bore-side layer and the outer periphery-side layer, the bonding strength in a hot condition will be undesirably reduced, and the structural strength of the refractory material of the intermediate layer will be undesirably increased to a level spoiling compressibility, for example, due to excessive sintering. The inside of the refractory material of the intermediate layer is exposed to a strong reduction atmosphere. Thus, if the additional component is a highly volatile component, such as a $SiO_2$ component, which is not formed as a mineral substance, the additional component itself will be undesirably vaporized and vanished, while causing vanishment of a carbon component.

An aggregate selectable for the additional component includes $Al_2O_3$, MgO, $ZrO_2$ and $Al_2O_3$.MgO-based spinel. The additional component may be appropriately selected from these components in conformity to a material of the inner bore-side layer to prevent a contact portion between the intermediate layer and the inner bore-side layer from creating a low-melting-point substance or the like. For example, when the inner bore-side layer consists of a CaO-containing refractory material, an MgO-based refractory aggregate is suitable. When the inner bore-side layer primarily comprises an $Al_2O_3$ or MgO-based material, $Al_2O_3$, MgO or $Al_2O_3 \cdot MgO$-based spinel is suitable. Preferably, the additional component comprises an MgO-based refractory aggregate containing MgO at a purity of 90% or more. In this case, the additional component is suitable when the inner bore-side layer consists of an $Al_2O_3$-based material or a $ZrO_2$-based material, and desirably capable of widely coping with various inner bore-side layers.

In case where a lower limit of a thickness of the intermediate layer is set to 1 mm, a particle size of the refractory aggregate constituting the additional component is preferably set to 0.5 mm or less to enhance dispersibility, and uniformity in the aforementioned various functions of the intermediate layer.

The intermediate layer is required to have corrosion resistance in such a case that, when a deficient portion is formed in the inner bore-side layer due to various actions during casting operation, it is necessary to suppress or prevent molten steel and other foreign substances from being brought into direct contact with the outer periphery-side layer having lower corrosion resistance, and it is necessary for the intermediate layer itself to reliably have durability, such as corrosion resistance and erosion resistance.

In the continuous casting nozzle, a portion to be directly exposed to molten steel, such as a deficient portion of the inner bore-side layer due to damage, a locally damaged portion in a weak region (e.g., an interface region between the inner bore-side layer and the nozzle body (outer periphery-side layer), a gas pool for gas injection or an interlayer junction), such as an interface region between the inner bore-side layer and the nozzle body (outer periphery-side layer), or an outlet portion of an immersion nozzle, exists or is likely to exist even in the form of a workpiece during a course of a production process thereof or a unused product. If the portion to be directly exposed to molten steel is poor in durability, such as corrosion resistance and erosion resistance, molten steel will intrude between the inner bore-side and outer periphery-side layers, for example, due to a selective vanishment of the portion, to case a defect of the continuous casting nozzle fatal to continuous casting operation, such as breaking of the continuous casting nozzle.

The refractory material for the intermediate layer of the present invention is suitable for a continuous casting nozzle having a function or structure for allowing molten steel to pass through an inner bore thereof, such as an immersion nozzle, an open nozzle, a long nozzle for a ladle, a sliding nozzle (hereinafter referred to as "SN"), an SN upper nozzle, or an SN lower nozzle (also called "collector").

A material for the inner bore-side layer of the continuous casting nozzle is not limited to a specific type, but a refractory material, such as an $Al_2O_3$-based material, an MgO-based material or a $ZrO_2$-based material, having properties required for the continuous casting nozzle depending on each continuous casting operation, specifically, such as erosion (abrasion) resistance of a portion for contact with molten metal, corrosion resistance of an inner bore, anti-attachment of inclusions such as $Al_2O_3$, onto an inner bore, and suitable for each intended purpose, may be used on a case-by-case basis (the refractory material may contain graphite and other component). Similarly, a material for the outer periphery-side layer of the continuous casting nozzle is not limited to a specific type. The outer periphery-side layer typically serves as a nozzle body of the continuous casting nozzle. Thus, a part or entirety of a portion of the outer periphery-side layer may be made of a refractory material, such as a conventional $Al_2O_3$-graphite based material, and a part or entirety of the mold-power portion may be made of a refractory material, such as a $ZrO_2$-based material.

The refractory material for the intermediate layer of the present invention is suitably used, particularly, in a combination of inner bore-side and outer periphery-side layers, wherein a refractory material of the inner bore-side layer has a thermal expansion coefficient greater than that of a refractory material of the outer periphery-side layer. It is understood that the refractory material for the intermediate layer of the present invention may also be used in case where, although each of inner bore-side and outer periphery-side layers has the same thermal expansion coefficient, for example, because they are made of the same material, a temperature gradient in a continuous casting nozzle formed by the inner bore-side and outer periphery-side layers or thermal shock to be supplied to the continuous casting nozzle is large enough to cause breaking of the continuous casting nozzle.

Based on the above knowledge about the intermediate layer, the inventors have further found that a unique condition exists when a CaO—MgO based refractory material is provided as an inner bore-side layer.

As disclosed, for example, in JP 2003-320444A, a CaO—MgO based refractory material is provided as an inner bore-side layer of a continuous casting nozzle to allow conventional problems, particularly, a problem of attachment of inclusions (typically, alumina) onto a surface of an inner bore and clogging of the inner bore, to be solved. However, the technique of employing the CaO—MgO based refractory material as an inner bore-side layer gave rise to new problems, particularly, a problem of breaking of an outer periphery-side layer due to expansion splitting, melting loss, breaking or peel-off of the inner bore-side layer, intrusion of scull between the inner bore-side layer and the outer periphery-side layer, or breaking of various regions of the nozzle.

Therefore, in the present invention, for the continuous casting nozzle where the inner bore-side layer is made of an MgO—CaO based refractory material, measures are taken to prevent damage of the outer periphery-side layer due to thermal expansion of the inner bore-side layer, and maintain fixation with each of the inner bore-side layer and the outer periphery-side layer without formation of a void space between the inner bore-side and outer periphery-side layers causing intrusion of molten metal.

Firstly, in the present invention, a composition of a CaO—MgO based material to be provided as an inner bore-side layer is specified. Specifically, a CaO—MgO based material containing a CaO component and an MgO component in a total amount of 80 mass % or more, wherein a mass ratio of CaO to MgO (CaO/MgO) is in the range of 0.2 to 1.5, is provided as an inner bore-side layer.

Thus, the inner bore-side layer having a CaO component-based function of maintaining attachment resistance and an MgO component-based function of maintaining corrosion resistance in a balanced manner is provided to sufficiently bring out an anti-alumina clogging function.

The CaO component reacts with an in-steel alumina-based deoxidation product which comes on a molten steel stream and into contact with a surface of an inner bore of the continuous casting nozzle, to create a CaO—$Al_2O_3$ based low-melting-point substance on a contact interface. This allows a slagged reaction product to easily flow down into a mold on the molten steel stream so as to prevent an alumina-clogging phenomenon in the nozzle. On the other hand, when an amount of the CaO component is increased, the CaO component will be continuously supplied from the refractory material to molten steel, so that an amount of melting loss in the refractory material is increased, and an amount of inclusions in steel is increased to cause deterioration in steel quality.

Although the MgO component is advantageous in terms of melting-loss resistance, because it does not create any low-melting-point substance through a reaction with an alumina component, an increase in amount of the MgO component is disadvantageous in terms of the alumina-clogging phenomenon.

Thus, the mass ratio CaO/MgO and the total amount (CaO+MgO) are critical parameters having an impact on melting-loss resistance and alumina-attachment resistance. Further, in terms of continuous casting operation, a flow rate of molten steel and an amount of alumina contained in molten steel have an impact on the melting-loss resistance and the alumina-attachment resistance. Generally, as the molten-steel flow rate becomes higher, an amount of alumina attachment becomes smaller and an amount of melting loss becomes larger. Further, as a concentration of in-steel alumina becomes higher, alumina attachment is accelerated under a certain condition. In conclusion, it is necessary to perform a material design in a composition range capable of achieving a balance between the alumina-attachment resistance and the melting-loss resistance while taking into account the conditions of casting operation and the type of molten steel.

In accordance with the above requirements, in the present invention, the composition of the inner bore-side layer is specified as described above. Specifically, if the mass ratio of the CaO component to the MgO component (CaO/MgO) is less than 0.2, the CaO component cannot be continuously supplied from the inner bore-side layer under typical conditions of casting operation where the molten-steel flow rate is 5 t/min or less, which precludes a possibility to maintain the alumina-attachment resistance. If the mass ratio CaO/MgO is greater than 1.5, the supply of the CaO component from the inner bore-side layer will be excessively increased to cause an increase in amount of melting loss in the inner bore-side layer itself, and an increase in amount of in-steel inclusions. The total amount of the CaO component and the MgO component is set to 80 mass % or more so as to achieve a balance between corrosion resistance and melting-loss resistance.

Preferably, the remainder after excluding the CaO component and the MgO component is comprised of a refractory material other than the CaO component and the MgO component, particularly, a carbon-based refractory material, in view of maintaining a balance between the corrosion resistance and the melting-loss resistance (anti-attachment). In the case where a carbon-based refractory material is used as the reminder, if the total amount of the CaO component and the MgO component is less than 80 mass %, an amount of a carbon component in the reminder is excessively increased, and thereby melting of the carbon component into molten steel becomes prominent to cause a problem that an amount of melting loss in the inner bore-side layer is excessively increased to shorten a lifetime of the nozzle, and an amount of in-steel inclusions is increased.

A CaO component source and an MgO component source to be used in the refractory material of the inner bore-side layer may be a dolomite clinker, a synthetic dolomite raw material, a magnesia raw material, or a calcia raw material. In particular, a CaO component in a burnt dolomite clinker continuously exists in the clinker. Thus, the burnt dolomite clinker is desirable in terms of continuous supply of CaO.

Preferably, a particle size of the CaO and MgO components is set in the range of 0.1 to 3 mm. If the particle size is less than 0.1 mm, a hydration phenomenon is likely to occur to cause problems in quality stability and volume stability, for example, in case where an MgO—CaO-based fine power is used in a large amount. If the particle size is greater than 3 mm, nonuniformity in composition or particle size in a shaped body is likely to occur, which is undesirable in terms of uniformity.

An intermediate layer for use with the above inner bore-side layer made of a CaO—MgO based material is prepared in such a manner that, after a heat treatment in a non-oxidation atmosphere at a temperature of about 600° C., it contains a hollow refractory aggregate in an amount of 10 to 75 volume %, with the remainder which contains, on an assumption that a total amount of the remainder is 100 mass %, one or more selected from the group consisting of Al, Si, Mg and an alloy comprising any combination of two or more thereof, in a total amount of 0.5 to 15 mass % in terms of only a content of the metals, and carbon in an amount of 2 to 99.5 mass %, wherein a value derived by dividing a mass ratio of CaO contained in the inner bore-side layer to the entire inner bore-side layer by a mass ratio of a total of $Al_2O_3$, $SiO_2$ and an alkali metal oxide contained in the intermediate layer to the entire intermediate layer is 10 or more, as mentioned above.

The reason is as follows. If the CaO component in the inner bore-side layer which contains the CaO component and the MgO component in a total amount 80 mass % or more, wherein the mass ratio of CaO to MgO (CaO/MgO) is in the range of 0.2 to 1.5, comes into contact with a large amount of $Al_2O_3$ and $SiO_2$ components, a CaO—$Al_2O_3$—$SiO_2$ based reaction product will be created, particularly, in prolonged casting operation, wherein the CaO component in the inner bore-side layer is consumed during the reaction, so that a function of capturing an $Al_2O_3$ inclusion in molten steel is lowered, and a bonded portion with the intermediate layer is excessively strengthened and deformed with shrinkage or the like to produce an uneven tension stress in the inner bore-side layer to increase a possibility to give rise to breaking (cracking) in the inner bore-side layer.

When an alkali metal oxide is added to the $Al_2O_3$—$SiO_2$ based component, the above phenomenon is accelerated. Further, if the value derived by dividing a mass ratio of CaO contained in the inner bore-side layer to the entire inner bore-side layer by a mass ratio of a total of $Al_2O_3$, $SiO_2$ and an alkali metal oxide contained in the intermediate layer to the entire intermediate layer is less than 10, the phenomenon becomes prominent.

In view of providing enhanced corrosion resistance against molten steel to an intermediate layer for use with the inner bore-side layer made of a CaO—MgO based material, an MgO-based refractory aggregate or an $Al_2O_3$.MgO-based spinel refractory aggregate is suitably used as refractory aggregate particles as the remaining component of the intermediate layer after excluding the hollow refractory aggregate, the carbon and the specific metal. Preferably, an amount of the MgO-based refractory aggregate or the $Al_2O_3$.MgO-based spinel refractory aggregate to be contained in the remaining component is adjusted to be 50 mass % or more (including 100 mass %).

A first reason is to provide a material combination which is less likely to produce an excessive cross-reaction, such as sintering or melting, in an interface between the inner bore-side and outer periphery-side layers. For the inner bore-side layer which contains the CaO component and the MgO component in a total amount 80 mass % or more, wherein the mass ratio of CaO to MgO (CaO/MgO) is in the range of 0.2 to 1.5, a magnesia or spinel (spinel comprising $Al_2O_3$ and MgO) based refractory aggregate itself or a mixture comprising the refractory aggregate is optimal, because it is less likely to produce a cross-reaction with the above refractory material of the inner bore-side layer.

A second reason is that the MgO-based refractory aggregate or the $Al_2O_3.MgO$-based spinel refractory aggregate is less likely to produce a cross-reaction with an $Al_2O_3.SiO_2$—C, $Al_2O_3$—C, $ZrO_2$—C or MgO—C based refractory material commonly used as an outer periphery-side layer.

A third reason is that, as compared with other aggregate, such as alumina-silica based refractory aggregate particles, MgO is relatively less likely to produce a cross-reaction with a vitreous component, a silica component, etc., in the hollow refractory aggregate.

In the above case, the outer periphery-side layer (nozzle body) may be made of any one of an $Al_2O_3$—C-based refractory material, a $ZrO_2$—C-based refractory material and an MgO—C-based refractory material, wherein a relationship between C and each of $Al_2O_3$, $ZrO_2$ and MgO, such as a composition ratio and an existence form, is not particularly limited.

Effect of the Invention

As above, in a continuous casting nozzle, when an inner bore-side region has thermal expansion greater than that of an outer periphery-side region, and, particularly, when a highly-functional layer having high corrosion resistance, high attachment resistance, etc., is disposed on the side of an inner bore to enhance durability, the refractory material of the present invention is used for an intermediate layer of the continuous casting nozzle. This makes it possible to prevent expansion splitting of an outer periphery-side layer due to a difference in thermal expansion between an inner bore-side layer, and the outer periphery-side layer as a nozzle body, and prevent peel-off and breaking of the inner bore-side layer during casting operation.

In addition, based on a deposit of the specific material, a stable bonding capability can be obtained, while achieving higher density and higher structural strength of the refractory material itself of the intermediate layer, so as to improve stability of a multi-layer structure and corrosion resistance of the intermediate layer.

Furthermore, the present invention provides an inner bore-side layer having a significantly high effect of suppressing attachment of inclusions (typically, $Al_2O_3$) onto the inner bore. Further, in the use of such an inner bore-side layer, the present invention makes it possible to prevent the occurrence of excessively strong bonding between the inner bore-side layer and the intermediate layer due to a CaO component, and solve a problem causing breaking (cracking) of the inner bore-side layer, such as drop-off or displacement of the inner bore-side layer due to insufficient bonding, to allow continuous casting operation to be stably performed over a long period of time.

In the continuous casting nozzle of the present invention, various refractory materials having properties required for the continuous casting nozzle depending on unique conditions of each continuous casting operation, specifically, such as erosion (abrasion) resistance of a portion for contact with molten metal, corrosion resistance of an inner bore, anti-attachment of inclusions such as $Al_2O_3$, onto an inner bore, and suitable for each intended purpose, can be used for each region on a case-by-case basis, so that the number of selectable materials and combinations thereof can be significantly increased. This also contributes to extension of a lifetime of a continuous casting nozzle, enhancement of steel quality, stable casting operation, and resource saving.

BEST MODE FOR CARRYING OUT THE INVENTION

Figure 1:
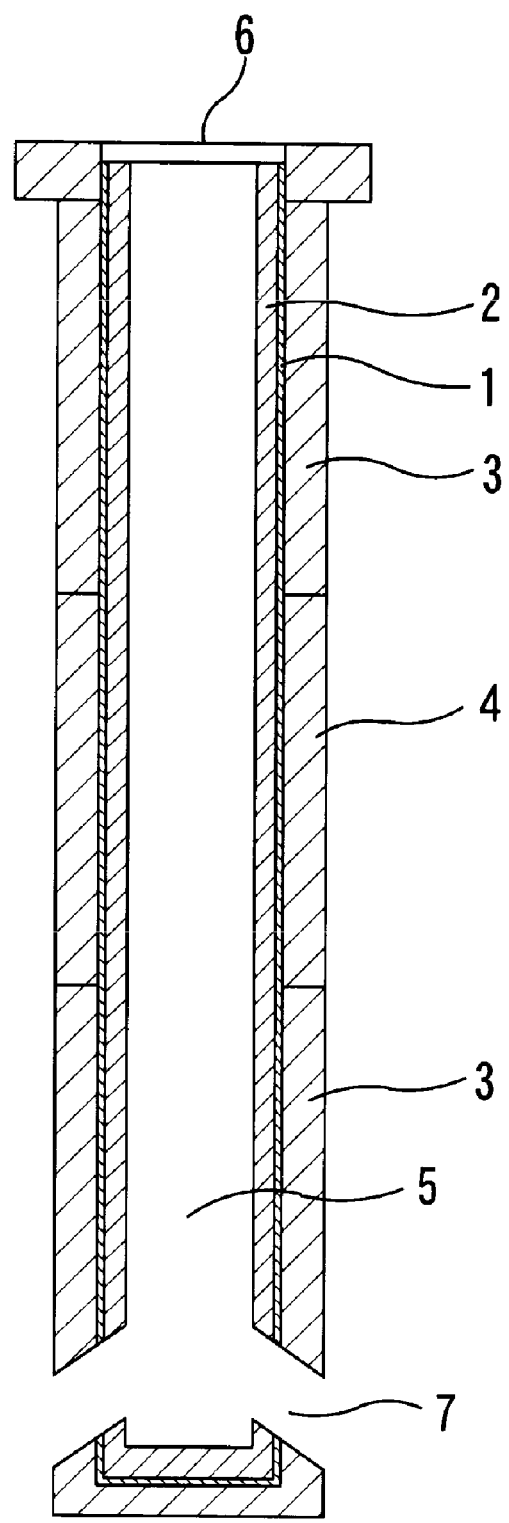
FIG. 1 is a sectional view of an immersion nozzle as one example of a continuous casting nozzle using a refractory material for an intermediate layer of the present invention, taken along an axis thereof

A method of producing a refractory material of the present invention will be firstly described.

In case where the refractory material itself of the present invention comprises a hollow refractory aggregate, carbon, and a specific metal, refractory aggregate particles constituting these components are mixed together. Then, a binder, such as an organic resin (e.g., phenol resin or vinyl acetate resin) which is capable of wetting the obtained power mixture to provide aggregability of the respective particles or bonding capability, and, after curing, exhibiting structural strength enough to ensure shape retainability as a shaped body, is added to the powder mixture in an appropriate amount required for shaping and shape retention, and they are kneaded to obtain a kneaded mixture. Then, the kneaded mixture is filled in a pre-defined space by an appropriate technique, such as pouring or injection, and shaped. Subsequently, the obtained shaped body is subjected to a heating treatment, such as drying or burning, at a temperature of about 110 to 600° C., at an appropriate temperature depending on properties of the binder and others to obtain the refractory material. Details of the method will be described below.

10 to 75 volume % of hollow refractory aggregate is mixed with 25 to 90 volume % of carbonaceous particles derived from flaky graphite, amorphous or earthy graphite, carbon black, pitch, resin or the like, and oxide particles or metal particles, such as magnesia, zirconia or corundum-based particles.

The 25 to 90 volume % of carbonaceous particles derived from flaky graphite, amorphous or earthy graphite, carbon black, pitch, resin or the like, and oxide particles or metal particles, are combined and mixed together, in such a manner that the obtained mixture comprises, as a percentage with respect to a total amount of the remainder after excluding the hollow refractory aggregate, one or more (specific metal) selected from the group consisting of Al, Si, Mg and an alloy comprising any combination of two or more thereof, in a total amount of 0.5 to 15 mass % in terms of only a content of the metals, and carbon in an amount of 2 to 99.5 mass %, with the remainder (including zero) being a refractory aggregate other than the specific metal and carbon. Preferably, a maximum particle size of this raw material is set to 0 5 mm or less to allow the refractory material of the intermediate layer to have uniform compressibility while being formed in mortar form excellent in working efficiency during application.

An amount of the hollow refractory aggregate may be determined by calculating a required compressive rate from a relationship between a thickness of the refractory material of the intermediate layer and each of thermal expansion coefficients of an inner bore-side layer and an outer periphery-side layer, and adjusting a ratio between the hollow refractory aggregate and the remaining raw materials.

Further, a mixing rate of each of the hollow refractory aggregate and the remaining raw materials, i.e., the remainder such as the refractory aggregate may be adjusted in such a manner that a value derived by dividing a mass ratio of CaO contained in the inner bore-side layer to be combined with the intermediate layer, to the entire inner bore-side layer, by a mass ratio of a total of $Al_2O_3$, $SiO_2$ and an alkali metal oxide contained in the intermediate layer to the entire intermediate layer is set to 10 or more.

Then, a binder, such as an organic resin (e.g., phenol resin or vinyl acetate resin) which is capable of wetting the mixture to provide aggregability of the respective particles or bonding capability, and, after curing, exhibiting structural strength enough to ensure shape retainability as a shaped body, is added to the above powder mixture in an amount adjusted to provide softness suitable for shaping of the mixture, and they are kneaded using a mixer, such as a mortar mixer, to obtain a mortar mixture. On an assumption that the powder mixture is 100 mass parts, an amount of phenol resin or other organic resin to be used may be adjusted in the range of 40 to 90 mass parts depending on required working efficiency.

Then, the mortar mixture is filled in a space pre-defined between the inner bore-side and outer periphery-side layers, by applying the mortar mixture onto one or both of surfaces of the inner bore-side and outer periphery-side layers and fitting the inner bore-side layer into the outer periphery-side layer, or other appropriate technique, such pouring or spraying, to integrate the inner bore-side layer and the outer periphery-side layer together. Then, the filled mortar mixture is subjected to a heating treatment, such as drying or burning, at a temperature of about 110 to 600° C., depending on properties of the binder and others, to allow the mortar mixture to exhibit shape retainability and interlayer fixing capability.

Practically, the above process for the refractory material of the intermediate layer is mostly incorporated as a part of an after-mentioned production process for a continuous casting nozzle structure to provide a continuous casting nozzle in the form of a single piece of product. Alternatively, the refractory material may be formed as a member having any suitable shape, such as a tubular shape, and be assembled as a part of a continuous casting nozzle. In this case, the mortal mixture may be shaped using a mold form, and dried or burned in a non-oxidation atmosphere to form the refractory member.

A production method for a continuous casting nozzle using the above refractory material of the intermediate layer will be described below.

An inner bore-side layer is formed as a single piece of refractory shaped body, separately from a nozzle body of a continuous casting nozzle. As long as this inner bore-side layer is prepared as a refractory shaped body in advance, a production method therefor is not particularly limited. A specific example will be described below, wherein the inner bore-side layer contains a CaO component and an MgO component.

A content rate of each component in a refractory raw material containing a CaO component and an MgO component, such as a fine powder raw material of burnt dolomite and a fine powder raw material of MgO clinker is adjusted in such a manner that, after a refractory shaped body of the refractory raw material is subjected to a heat treatment in a non-oxidation atmosphere at 600° C., the refractory shaped body contains a CaO composition and an MgO composition in a total amount of 80 mass % or more, wherein a mass ratio of CaO to MgO (CaO/MgO) is in the range of 0.2 to 1.5. Then, a binder, such as phenol resin, which has a binding capability after a heat treatment in a non-oxidation atmosphere at 600° C., and a liquid shaping assistant for obtaining a wet state suitable for shaping (if the binder is in liquid form, it can also serve as the shaping assistant) is added to the fine powder raw materials, and they are uniformly mixed together by a mixer to obtained a mixture for shaping.

The obtained mixture is shaped by an appropriate forming machine, such as a CIP (Cold Isostatic Press) machine, a hydraulic press machine or a friction press machine, and the obtained shaped body is dried at a temperature of about 150° C. or more, or subjected to a heat treatment in a non-oxidation atmosphere. Subsequently, according to need, the shaped body, such as an outer peripheral surface thereof, is machined into a shape suitable for being attached to the nozzle body prepared as a separate body, by a conventional machining technique. A generally required treatment for the raw materials or the shaped body, such as measures against hydration, may be performed depending on the raw materials and production conditions on a case-by-case basis.

A space having a given thickness for the intermediate layer is pre-defined between the shaped body separately prepared as the inner bore-side layer in the above manner and the nozzle body separately prepared as the outer periphery-side layer, and the refractory material of the present invention is filled into the space to form the intermediate layer so as to complete a continuous casting nozzle having a multi-layer structure.

The refractory material of the present invention to be used for the intermediate layer is formed in muddy unshaped form enough to be able to be filled into a narrow space between the inner bore-side and outer periphery-side layers. With a view to providing working efficiency during filling, a liquid resin may be added to the refractory material in an amount of about 40 to 90 mass parts (this amount is determined in consideration of a volume of the space and working efficiency during setup) with respect to and in addition to 100 mass parts of the powder mixture comprising the hollow refractory aggregate, the carbon raw material in solid form, and the remaining components including the refractory aggregate, and they are kneaded.

The refractory material for the intermediate layer improved in working efficiency during setup is applied onto an outer peripheral surface of the inner bore-side layer provided with a spacer for defining a given space having a thickness of the intermediate layer, or an inner peripheral surface of the outer periphery-side layer, and then the inner bore-side layer is inserted into the outer periphery-side layer (nozzle body of a continuous casting nozzle to be produced). In this state, a space defined between the outer peripheral surface of the inner bore-side layer and the inner peripheral surface of the outer periphery-side layer becomes equal to the thickness of the intermediate layer.

In place of the above filling technique based on application, the refractory material for the intermediate layer may be prepared to have a higher fluidity, for example, by adding liquid at a higher rate, and poured into a given space defined between the inner bore-side and outer periphery-side layers.

An obtained continuous casting nozzle having the filled refractory material for the intermediate layer is subjected to a heating treatment, such as drying or burning, to cure the refractory material for the intermediate layer so as to fix the inner bore-side layer to the outer periphery-side layer. The curing may be performed at an appropriate temperature, in a temperature range of room temperature to about 600° C., depending on properties of the binder contained in the refractory material of the intermediate layer. For example, in case where a vinyl-based resin is used as the binder, the curing may be achieved by drying at about 150° C. In case where a phenol resin is used as the binder, a heating temperature is preferably set at 200° C. or more. Subsequently, the continuous casting nozzle may further be burnt, for example, in a non-oxidation atmosphere at a temperature of about 1000 to 1300° C. In the above manner, a semifinished product of the continuous casting nozzle of the present invention can be obtained.

The hollow refractory aggregate used in the refractory material for the intermediate layer is kept from broking by an external force during installation/setup of the inner bore-side layer to the outer periphery-side layer, to prevent the occurrence of an undesirable situation where a thickness of the intermediate layer becomes excessively reduced due to the setup operation, or a required compressibility of the intermediate layer is spoiled due to absorption of a solvent. Further, the hollow refractory aggregate is formed in a balloon-like configuration which has a rounded outer shape almost without an edge as in a spalled particle. This makes it possible to obtain an advantage of being able to improve fluidity of the muddy refractory material of the intermediate layer, i.e., to reduce an amount of liquid phase so as to achieve a dense matrix structure.

However, in either technique, if the hollow refractory aggregate is pressed by a pressure greater than the structural strength thereof during shaping or setup operation, it will be broken to lose a stress relaxation capability. Thus, the hollow refractory aggregate cannot be subjected to various high-pressure press forming process commonly used for simultaneously/integrally forming a plurality of layers of a continuous casting nozzle, such as cold isostatic press (CIP), based on a pressure fairly greater than at least 2.5 MPa at which the hollow refractory aggregate is broken.

nozzle, such as machining of an outer periphery thereof and others, and application of an antioxidant.

Through the above production method, the continuous casting nozzle of the present invention comprising the intermediate layer with compressibility and the inner bore-side and outer periphery-side layers continuously integrated with the intermediate layer can be obtained.

FIG. 1 shows an immersion nozzle as one example of the continuous casting nozzle of the present invention. In FIG. 1, the reference numerals 1, 2, 3 and 4 indicate an intermediate layer, an inner bore-side layer made of an MgO—CaO-based refractory material, an alumina-graphite layer as a part of an outer periphery-side layer serving as a nozzle body of the continuous casting nozzle, and a zirconia-graphite based layer serving as a powder region which is remaining part of the outer periphery-side layer, respectively. Further, the reference numerals 5, 6 and 7 indicate an inner bore, a molten-steel inlet opening, and an outlet opening.

EXAMPLE

Various examples will be described below.

Example A

Example A is a result of a test for checking an influence of an average radius R of each particle of a hollow refractory aggregate and a ratio of the average radius R to an average wall thickness t of the particle (R/t) on breaking of the hollow refractory aggregate when an external force of 2.5 MPa is applied thereto.

Table 1 shows a material/structure and a test result of each sample in Example A.

TABLE 1

| | | Comparative sample 1 | Inventive sample 1 | Inventive sample 2 | Inventive sample 3 | Comparative sample 2 | Inventive sample 4 | Inventive sample 5 |
|---|---|---|---|---|---|---|---|---|
| Material of hollow refractory aggregate | | alumina-silicate based material | | | | | | |
| Average radius R | μm | 2.5 | 2.5 | 2.5 | 35 | 250 | 250 | 250 |
| Average wall thickness t | μm | 1.3 | 0.25 | 0.2 | 1 | 31 | 25 | 10 |
| Ratio (R/t) | | 1.9 | 10 | 12.5 | 35 | 8 | 10 | 25 |
| Breakup rate in container during vertical compression by 2.5 MPa | % | <3 | 95 | 98 | 99 | <45 | 90 | 99 |

In the above production method, a binder is used in the refractory material for the intermediate layer to provide a shape retainability of the intermediate layer itself and a structural strength of the intermediate layer between room temperature to a hot condition during use, and ensure a formability of the mixture. In case where the inner bore-side layer contains an MgO—CaO based component, particularly CaO existing by itself (not in the form of a solid solution or a compound), it is necessary to use a binder which is devoid of water, and less likely to release moisture during heating, in order to prevent breakup or the like of the inner bore-side layer after setup, due to hydration of a CaO component therein. A binder meeting this requirement includes non-water based phenol resin, non-water based furan resin, tar, melamine resin, epoxy resin, and polyvinyl acetate resin using alcohol as a solvent.

Carbon derived from the binder and left at 600° C. or more serves as a part of a carbon component of the refractory material of the intermediate layer.

The semifinished product of the continuous casting nozzle after the filling and the heating treatment may be subjected to the same process as that for conventional continuous casting A hollow refractory aggregate for test samples was obtained by selecting one of available products generally sold on the market, dispersing particles thereof in water, collecting floated ones of the particles, classifying the collected particles, and drying the classified particles at 110° C. The refractory aggregate for test samples had a composition which comprises 70 mass % or more of $SiO_2$, 1 to 10 mass % of an alkali metal oxide and an alkaline earth metal oxide in total, and 5 to 20 mass % of $Al_2O_3$, and a glassy structure.

The refractory aggregate for test samples had three types of particles having average radii of 2.5 μm (desirable minimum radius), 250 μm (desirable maximum radius) and 35 μm (intermediate radius). Each type of particles was classified of into a plurality of groups each having a different average wall thickness to obtain a plurality of test samples each having a different ratio R/t.

Figure 3:
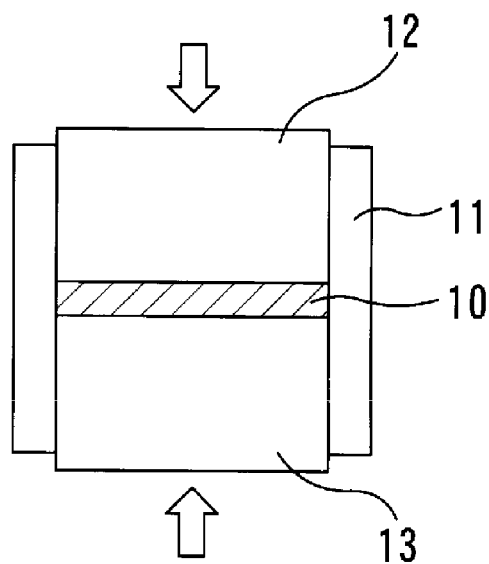
FIG. 3 is a schematic vertical sectional view showing a sample and a testing apparatus during a breaking test for a hollow refractory aggregate in Example A.

In the test, as shown in FIG. 3, each of the test samples 10 was filled in a cylindrical metal container 11 having an inner diameter of 60 mm to have an initial height dimension (thickness) of 10 mm, and pressed by a pressure of 2.5 MPa using a press machine (having an upper liner 12 and a lower liner 13) until it is stopped. Then, after taking the test sample out from the container 11, particles of the test sample were dispersed in 1 liter of water to separate the particles into a floated group and a precipitated group, and the floated particles are collected. After drying the collected particles, a weight of the dried particles was measured.

A breakup rate (%) was derived by subtracting a total weight of the floated particles from a total weight of the test sample 10 initially filled in the cylindrical metal container 11 (this total weight will hereinafter be referred to as "initial total weight") and dividing the obtained value by the initial total weight, and expressed by percentage.

In Example A, considering that a matrix portion exhibits a certain level of compressibility, a requirement for obtaining a required compressive rate was set as a condition that the breakup rate of the hollow refractory aggregate is 90% or more. Further, in this test, it is assumed that fragments of the particles broken by the pressing are filled in an inter-particle space to bring out a stress relaxation capability by themselves, whereby the remaining unbroken particles become less likely to be broken, and a part of the unbroken particles will be left without breaking. Thus, it can be evaluated that a group of particles having a breakup rate of 90% or more exhibits the same or better level of breaking capability in a refractory structure.

Each of the samples having an average radius R ranging from the desirable minimum radius 2.5 μm to the desirable maximum radius 250 μm had a breakup rate of 90% or more when the ratio R/t is 10 or more.

Example B

Example B is a result of a test for checking an influence of a volume percentage of a hollow refractory aggregate with respect to a refractory material, on a compressibility and a bonding strength, and a result of a simulation test for casting of molten steel based on inner-bore heating.

Table 2 shows a composition and a test result of each sample in Example B.

TABLE 2

|  |  | Comparative sample 3 | Comparative sample 4 | Comparative sample 5 | Inventive sample 6 | Inventive sample 7 |
|---|---|---|---|---|---|---|
| Hollow refractory aggregate | volume % | 0 | 5 | 8 | 10 | 25 |
| Reminder (matrix) | volume % | 100 | 95 | 92 | 90 | 75 |
| Mixing rate in remainder (100) *1 |  |  |  |  |  |  |
| Graphite fine powder (45 μm or less) | mass % | 75 | 75 | 75 | 75 | 75 |
| Al—Mg alloy (45 μm or less) | mass % | 10 | 10 | 10 | 10 | 10 |
| MgO fine powder (45 μm or less) | mass % | 10 | 10 | 10 | 10 | 10 |
| Phenol solution (as C) | mass % | 5 | 5 | 5 | 5 | 5 |
| Rate of carbon in remainder | mass % | 80 | 80 | 80 | 80 | 80 |
| Compressive rate (to 2.5 MPa) at 1000° C. | % | 3 | 4 | 6 | 12 | 28 |
| Compressive rate (to 2.5 MPa) at 1500° C. | % | 2 | 3 | 5 | 10 | 26 |
| Bonding strength at 1000° C. | MPa | 4.00 | 2.90 | 2.10 | 1.50 | 1.00 |
| Bonding strength at 1500° C. | MPa | 2.60 | 2.10 | 1.50 | 1.30 | 0.80 |
| Condition of K in Formula 1 *2 |  | x | x | ○ | ○ | ○ |
| Result of inner-bore heating test *3 | 1st cycle | C | C | ○ | ○ | ○ |
|  | 2nd cycle | — | — | ○ | ○ | ○ |
|  | 3rd cycle | — | — | C | ○ | ○ |

|  |  | Inventive sample 8 | Inventive sample 9 | Inventive sample 10 | Comparative sample 6 | Comparative sample 7 |
|---|---|---|---|---|---|---|
| Hollow refractory aggregate | volume % | 50 | 65 | 75 | 80 | 85 |
| Reminder (matrix) | volume % | 50 | 35 | 25 | 20 | 15 |
| Mixing rate in remainder (100) *1 |  |  |  |  |  |  |
| Graphite fine powder (45 μm or less) | mass % | 75 | 75 | 75 | 75 | 75 |
| Al—Mg alloy (45 μm or less) | mass % | 10 | 10 | 10 | 10 | 10 |
| MgO fine powder (45 μm or less) | mass % | 10 | 10 | 10 | 10 | 10 |
| Phenol solution (as C) | mass % | 5 | 5 | 5 | 5 | 5 |
| Rate of carbon in remainder | mass % | 80 | 80 | 80 | 80 | 80 |
| Compressive rate (to 2.5 MPa) at 1000° C. | % | 52 | 67 | 80 | 86 | 88 |
| Compressive rate (to 2.5 MPa) at 1500° C. | % | 48 | 63 | 79 | 83 | 87 |
| Bonding strength at 1000° C. | MPa | 0.80 | 0.70 | 0.55 | 0.40 | 0.30 |
| Bonding strength at 1500° C. | MPa | 0.40 | 0.20 | 0.05 | 0.00 | 0.00 |
| Condition of K in Formula 1 *2 |  | ○ | ○ | ○ | ○ | ○ |
| Result of inner-bore heating test *3 | 1st cycle | ○ | ○ | ○ | ○ | D |
|  | 2nd cycle | ○ | ○ | ○ | D | D |
|  | 3rd cycle | ○ | ○ | ○ | D | — |

*1: Corresponding to a state after heat treatment in a non-oxidation atmosphere at 600° C.
*2: ○: satisfying the condition, x: unsatisfying the condition
*3: ○: no defect, C: crack, D: drop-off A hollow refractory aggregate used in Example B was a powder (sample 3) which has the same composition as that of the hollow refractory aggregate used in Example A, an average diameter R of 35 μm, an average wall thickness t of 1 μm, and a breakup rate of 99% at 2.5 MPa. Any sample in Example B was prepared to have the same composition of the remainder after excluding the hollow refractory aggregate.

A compressive rate was measured as follows. Two bonding-target test pieces having a size of 20 mm φ×50 mm L and comprising about 75 mass % of $Al_2O_3$ and about 25 mass % of C were prepared by the same production method (the same conditions of forming pressure, drying, burning, etc.) as that for conventional continuous casting nozzles. Then, each of the samples formed as a mortar mixture was installed in a space between respective flat surfaces of the two bonding-target test pieces to have a thickness of 2 mm to form a measurement sample by the method described in the "MEANS FOR SOLVING THE PROBLEM", and the measurement sample was subjected to drying. A compressive rate of the obtained measurement sample was measured at 1000° C. and 1500° C. (in a nitrogen gas atmosphere).

Figure 2:
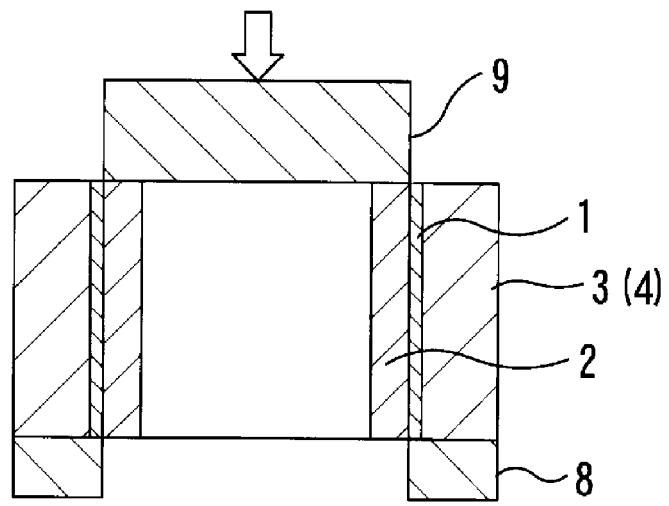
FIG. 2 is a schematic sectional view showing a sample and a testing apparatus during a bonding strength test, taking along an axis of the sample.

A bonding strength was measured as follows. Through the same production method (the same conditions of forming pressure, drying, burning, etc.) as that for conventional continuous casting nozzles, a cylindrical tube serving as an outer periphery-side layer made of a refractory material comprising about 55 mass % of $Al_2O_3$, about 30 mass % of C and about 14 mass % of $SiO_2$, which is commonly-used for a nozzle body of a continuous casting nozzle, and formed to have a size of 95 mm φ (inner diameter)×100 mm L, and a cylindrical tube serving as an inner bore-side layer made of a dolomite-based refractory material comprising about 49 mass % of MgO, about 44 mass % of CaO and about 4 mass % of C and formed to have a size of 90 mm φ (outer diameter)×100 mm L, were prepared. Then, each of the samples formed as a mortar mixture was installed in a space between the two cylindrical tubes to have a thickness of 2.5 mm, and subjected to drying to form a ring-shaped measurement sample. A bonding strength of the obtained ring-shaped measurement sample was measured at 1000° C. and 1500° C. (in a nitrogen gas atmosphere) by the method described in connection with FIG. 2.

A cylindrical sample for the inner-bore heating test was prepared as follows. Firstly, a cylindrical tube-shaped body was formed by a CIP process. This shaped body was subjected to drying at 200° C. and a heat treatment in a non-oxidation atmosphere at 1000° C., and then an outer periphery of the shaped body was machined to obtain a dolomite-carbon based sleeve having a size of 90 mm φ (outer diameter)×70 mm φ (inner diameter)×750 mm (height dimension). A thermal expansion amount of the material of the sleeve at 1500° C. was 1.32%. This sleeve was inserted into a flanged cylindrical refractory member (inner diameter: 95 mm, outer diameter: 140 mm, height dimension: 750 mm) made of an $Al_2O_3$—$SiO_2$—C-based material (thermal expansion amount at 1500° C.: 0.55%) comprising about 55 mass % of $Al_2O_3$, about 30 mass % of C and about 14 mass % of $SiO_2$, through a joint made of a mortar refractory material for an intermediate layer as shown in Table 2 and filled to have a thickness of 2.5 mm. The refractory material for the intermediate layer was formed by mixing a graphite fine powder, an Al—Mg alloy powder, an MgO fine powder, a pitch powder, and a hollow refractory aggregate (hollow vitreous aggregate) serving as a compressibility source, and a liquid phenol resin was used as a working-efficiency improver and a binder. The obtained assembly was subjected to drying at 200° C. to obtain the cylindrical sample for the inner-bore heating test.

The inner-bore heating test was carried out as follows. A combustion gas consisting of propane and oxygen was supplied from an upper flange toward a lower flange of the cylindrical sample so as to pass through an inner bore of the cylindrical sample to rapidly heat the cylindrical sample from the side of the inner bore. The heating was performed under a condition that a central region of an outer peripheral surface of the cylindrical sample was heated up to a temperature of 1400° C. after 1 hour from initiation of heating (this rapid heating is a relatively severe condition in view of actual casting operation). Then, the heating was stopped, and the cylindrical sample was naturally cooled down to 300° C. This heat treatment was repeated, and respective states of the inner bore-side layer and the outer periphery-side layer were observed.

As is evident from the measurement result shown in Table 2, approximately the same compressive rate as the volume percentage of the hollow refractory aggregate can be obtained. Further, the cylindrical sample satisfy a condition that the compressive rate is 10% or more at 1000° C., and 80% or less at 1500° C., when the hollow refractory material is contained in an amount of 10 to 75 volume %.

In the inner-bore heating test, when the hollow refractory material is contained in an amount of less than 10 volume % (comparative samples 3 to 5), cracking occurred. When the hollow refractory material is contained in an amount of greater than 75 volume % (comparative samples 6 and 7), looseness occurred in the inner bore-side layer, and drop-off of the inner bore-side layer tended to occur.

Example C

Example C is a result of a test for checking an influence of a percentage of a specific metal with respect to a refractory material containing a hollow refractory aggregate, on a compressibility and a bonding strength, and a result of a comparison with a simulation test for casting of molten steel based on inner-bore heating, for each sample.

Table 3 shows a composition and a test result of each sample in Example C.

TABLE 3

|  |  | Inventive sample 11 | Inventive sample 12 | Inventive sample 13 | Inventive sample 14 | Inventive sample 9 | Inventive sample 15 |
| --- | --- | --- | --- | --- | --- | --- | --- |
| Hollow refractory aggregate | volume % | 65 | 65 | 65 | 65 | 65 | 65 |
| Remainder (matrix) | volume % | 35 | 35 | 35 | 35 | 35 | 35 |
| Mixing rate in remainder (100) *1 |  |  |  |  |  |  |  |
| Graphite fine powder (45 μm or less) | mass % | 75 | 75 | 75 | 75 | 75 | 75 |
| Metal Al—Mg alloy (45 μm or less) | mass % | 0.0 | 0.3 | 0.5 | 5 | 10 | 15 |
| Metal Al (45 μm or less) | mass % |  |  |  |  |  |  |
| Metal Al—Mg—Ca (45 μm or less) | mass % |  |  |  |  |  |  |
| MgO fine powder (45 μm or less) | mass % | 20 | 19.7 | 19.5 | 15 | 10 | 5 |
| Phenol solution (as C) | mass % | 5 | 5 | 5 | 5 | 5 | 5 |
| Rate of metal in remainder | mass % | 0.0 | 0.3 | 0.5 | 5 | 10 | 15 |
| Rate of carbon in remainder | mass % | 80.0 | 80.0 | 80.0 | 80.0 | 80.0 | 80.0 |
| Compressive rate (to 2.5 MPa) at 1000° C. | % | 88 | 82 | 80 | 75 | 55 | 40 |
| Compressive rate (to 2.5 MPa) at 1500° C. | % | 82 | 76 | 74 | 70 | 54 | 33 |
| Condition of K in Formula 1 *2 |  | ○ | ○ | ○ | ○ | ○ | ○ |

TABLE 3-continued

| | | | | | | | |
|---|---|---|---|---|---|---|---|
| Bonding strength at 1000° C. | MPa | 0.1 | 0.1 | 0.2 | 0.4 | 0.7 | 1.5 |
| Bonding strength at 1500° C. | MPa | <0.01 | <0.01 | 0.02 | 0.2 | 0.2 | 1.4 |
| Result of inner-bore heating test *3 | 1st cycle | ○ | ○ | ○ | ○ | ○ | ○ |
| | 2nd cycle | D | D | ○ | ○ | ○ | ○ |
| | 3rd cycle | — | — | ○ | ○ | ○ | ○ |

| | | Inventive sample 16 | Inventive sample 17 | Inventive sample 18 | Inventive sample 19 | Inventive sample 20 | Inventive sample 21 |
|---|---|---|---|---|---|---|---|
| Hollow refractory aggregate | volume % | 65 | 65 | 65 | 65 | 65 | 65 |
| Remainder (matrix) | volume % | 35 | 35 | 35 | 35 | 35 | 35 |
| Mixing rate in remainder (100) *1 | | | | | | | |
| Graphite fine powder (45 μm or less) | mass % | 75 | 75 | 75 | 75 | 75 | 75 |
| Metal Al—Mg alloy (45 μm or less) | mass % | 18 | 20 | | | | |
| Metal Al (45 μm or less) | mass % | | | 0.5 | 15 | | |
| Metal Al—Mg—Ca (45 μm or less) | mass % | | | | | 0.5 | 15 |
| MgO fine powder (45 μm or less) | mass % | 2 | 0 | 19.5 | 5 | 19.5 | 5 |
| Phenol solution (as C) | mass % | 5 | 5 | 5 | 5 | 5 | 5 |
| Rate of metal in remainder | mass % | 18 | 20 | 0.5 | 15 | 0.5 | 15 |
| Rate of carbon in remainder | mass % | 80.0 | 80.0 | 80.0 | 80.0 | 80.0 | 80.0 |
| Compressive rate (to 2.5 MPa) at 1000° C. | % | 20 | 13 | 79 | 38 | 77 | 32 |
| Compressive rate (to 2.5 MPa) at 1500° C. | % | 16 | 9 | 76 | 36 | 42 | 31 |
| Condition of K in Formula 1 *2 | | ○ | ○ | ○ | ○ | ○ | ○ |
| Bonding strength at 1000° C. | MPa | 2.8 | 3.8 | 0.2 | 1.1 | 0.3 | 1.4 |
| Bonding strength at 1500° C. | MPa | 2.4 | 3.4 | 0.01 | 0.9 | 0.03 | 1.3 |
| Result of inner-bore heating test *3 | 1st cycle | ○ | C | ○ | ○ | ○ | ○ |
| | 2nd cycle | C | — | ○ | ○ | ○ | ○ |
| | 3rd cycle | — | — | ○ | ○ | ○ | ○ |

*1: Corresponding to a state after heat treatment in a non-oxidation atmosphere at 600° C.
*2: ○: satisfying the condition, x: unsatisfying the condition
*3: ○: no defect, C: crack, D: drop-off A hollow refractory aggregate used in Example C has the same composition and the same particle-size distribution as those of the hollow refractory aggregate used in Example B. Any sample in Example C was prepared to have the same composition of the remainder after excluding the hollow refractory aggregate, except the specific metal, and the specific metal was added to the remainder while changing an amount thereof.

The measurement of a compressive rate, and a bonding strength, and the simulation test for casting of molten steel based on inner-bore heating, were carried out in the same manner as that in Example B.

As is evident from the measurement result shown in Table 3, each sample satisfies a requirement that the bonding strength as a desired effect from addition of the specific metal is in the range of 0.01 to 1.5 MPa, when a content of the specific metal is in the range of 0.5 to 15 mass %.

In the inner-bore heating test, a desired result was obtained when the content of the specific metal is in the range of 0.5 to 15 mass %, and this tendency primarily corresponds to the given range of the bonding strength.

Example D

Example D is a result of a test for checking an influence of a percentage of carbon with respect to the remainder after excluding a hollow refractory aggregate, on a compressibility and a bonding strength, and a result of a simulation test for casting of molten steel based on inner-bore heating.

Table 4 shows a composition and a test result of each sample in Example D.

TABLE 4

| | | Inventive sample 22 | Inventive sample 23 | Inventive sample 24 | Inventive sample 25 | Inventive sample 9 | Inventive sample 26 | Inventive sample 27 |
|---|---|---|---|---|---|---|---|---|
| Hollow refractory aggregate | volume % | 65 | 65 | 65 | 65 | 65 | 65 | 65 |
| Remainder (matrix) | volume % | 35 | 35 | 35 | 35 | 35 | 35 | 35 |
| Mixing rate in remainder (100) *1 | | | | | | | | |
| Graphite fine powder (45 μm or less) | mass % | 0 | 0 | 50 | 70 | 75 | 94.5 | 95 |
| Al—Mg alloy (45 μm or less) | mass % | 10 | 10 | 10 | 10 | 10 | 0.5 | 0.0 |
| MgO fine powder (45 μm or less) | mass % | 89 | 88 | 35 | 15 | 10 | 0 | 0 |
| Phenol solution (as C) | mass % | 1 | 2 | 5 | 5 | 5 | 5 | 5 |
| Rate of metal in remainder | mass % | 10 | 10 | 10 | 10 | 10 | 0.5 | 0 |
| Rate of carbon in remainder | mass % | 1 | 2 | 55 | 75 | 80 | 99.5 | 100 |
| Compressive rate (to 2.5 MPa) at 1000° C. | % | 35 | 30 | 38 | 52 | 55 | 78 | 85 |
| Compressive rate (to 2.5 MPa) at 1500° C. | % | 31 | 28 | 36 | 50 | 54 | 62 | 83 |
| Condition of K in Formula 1 *2 | | ○ | ○ | ○ | ○ | ○ | ○ | ○ |

TABLE 4-continued

|  |  | Inventive sample 22 | Inventive sample 23 | Inventive sample 24 | Inventive sample 25 | Inventive sample 9 | Inventive sample 26 | Inventive sample 27 |
|---|---|---|---|---|---|---|---|---|
| Bonding strength at 1000° C. | MPa | 0.1 | 0.2 | 0.4 | 0.6 | 0.7 | 0.3 | 0.1 |
| Bonding strength at 1500° C. | MPa | <0.01 | 0.1 | 0.1 | 0.2 | 0.2 | 0.1 | <0.01 |
| Result of inner-bore heating test *3 | 1st cycle | ○ | ○ | ○ | ○ | ○ | ○ | ○ |
|  | 2nd cycle | D | ○ | ○ | ○ | ○ | ○ | D |
|  | 3rd cycle |  | ○ | ○ | ○ | ○ | ○ |  |

*1: Corresponding to a state after heat treatment in a non-oxidation atmosphere at 600° C.
*2: ○: satisfying the condition, x: unsatisfying the condition
*3: ○: no defect, C: crack, D: drop-off A hollow refractory aggregate used in Example D has the same composition and the same particle-size distribution as those of the hollow refractory aggregate used in each of Examples B and C.

In Example D, fundamentally, (except the sample containing carbon in an amount of 99.5 mass % or more), an amount of a specific metal and a phenol resin solution (converted to C to be left after a heat treatment in a non-oxidation treatment at 1000° C.) was fixed, and an amount of carbon was changed by replacing an MgO fine powder (MgO purity: 95 to 98 mass %; other Examples have the same condition) with a graphite fine powder.

The measurement of a compressive rate, and a bonding strength, and the simulation test for casting of molten steel based on inner-bore heating, were carried out in the same manner as that in each of Examples B and C.

As is evident from the measurement result shown in Table 4, the desired range of the bonding strength of 0.01 to 1.5 MPa can be obtained, when a content of carbon in the remainder metal is in the range of 2 to 99.5 mass %.

MgO in a refractory material for an inner bore-side layer, on melting loss and alumina attachment.

Each of various types of CaO—MgO based materials each having a different mass ratio of CaO/MgO and/or a different content of CaO+MgO was shaped by a cold isostatic press (CIP) process at 98 MPa, and the obtained shaped body was subjected to a heat treatment in a non-oxidation atmosphere. Then, a bar-shaped sample (20×20×160 mm) was cut out from the shaped body to obtain a test sample.

Each of the samples was immersed in low-carbon aluminum-killed steel held at a temperature of 1550 to 1570° C., for 120 minutes, and then pulled up to measure a thickness of an alumina-attachment layer on a surface of the sample, and an amount of melting loss in the sample itself. For comparison, a conventional $Al_2O_3$-graphite based material was also subjected to the test.

Table 5 shows a composition and a test result of each sample in Example E.

TABLE 5

|  | Sample 28 | Sample 29 | Sample 30 | Sample 31 | Sample 32 | Sample 33 | Sample 34 | Sample 35 | Sample 36 | Sample 37 | Sample 38 | Sample 39 |
|---|---|---|---|---|---|---|---|---|---|---|---|---|
| Mass ratio of CaO/MgO | — | 1.7 | 1.5 | 1.1 | 0.2 | 0.1 | 1.5 | 1.5 | 1.5 | 0.2 | 0.2 | 0.2 |
| Mass % of CaO + MgO | — | 95 | 95 | 95 | 95 | 95 | 98 | 80 | 75 | 98 | 80 | 75 |
| $Al_2O_3$ | 57 | — | — | — | — | — | — | — | — | — | — | — |
| $SiO_2$ | 11 | — | — | — | — | — | — | — | — | — | — | — |
| Free C | 29 | 4 | 4 | 4 | 4 | 4 | 1 | 19 | 24 | 1 | 19 | 24 |
| CaO | — | 60 | 57 | 50 | 16 | 9 | 59 | 48 | 45 | 16 | 13 | 13 |
| MgO | — | 35 | 38 | 45 | 79 | 86 | 39 | 32 | 30 | 82 | 67 | 63 |
| Thermal expansion amount at 1500° C. | 0.55 | 0.82 | 0.83 | 1.32 | 1.91 | 1.98 | 0.93 | 1.00 | 1.10 | 2.01 | 1.65 | 1.50 |
| <Melting loss/attachment test> *1 |  |  |  |  |  |  |  |  |  |  |  |  |
| Thickness of alumina-attachment layer (in mm) | x 3.0 | ○ 0 | ○ 0 | ○ 0 | Δ 0.4 | x 0.9 | ○ 0 | ○ 0 | ○ 0 | Δ 0.5 | ○ 0.2 | ○ 0.1 |
| Amount of melting loss in each sample (in mm) Low-carbon Al-killed steel immersed for 120 min Flow rate: 1.2 m/sec at 1570° C. | ○ 0 | x 1.5 | ○ 0.2 | ○ 0.1 | ○ 0 | ○ 0 | ○ 0 | Δ 0.5 | x 1.4 | ○ 0 | ○ 0.3 | x 1.1 |

*1: Relative evaluation in laboratory evaluation
○: excellent
Δ: good
x: bad

In the inner-bore heating test, a desired result was obtained when the content of carbon is in the range of 2 to 99.5 mass %, and this tendency primarily corresponds to the given range of the bonding strength, as with Example C.

Example E

Example E is a result of a test for checking an influence of a total amount of CaO and MgO and a mass ratio of CaO to In the samples 30 to 32, 34, 35, 37 and 38, each of the melting-loss amount and the alumina-attachment amount was in a well-balanced desired range. On the other hand, in the sample 28 comprising a conventional AG-based material, alumina attachment occurred although no melting-loss phenomenon occurred. The sample 28 is likely to cause a problem of clogging. In the sample 29 where the ratio of CaO/MgO is 1.7, large melting loss occurred. In the example 33 where the ratio of CaO/MgO is 0.1, large alumina attachment occurred. In each of the examples 36 and 39 where the total amount of CaO +MgO is 75 mass %, an amount of melting loss in the sample became larger due to an influence of carbon amount.

Depending on conditions of casting using the continuous casting nozzle of the present invention, the physical properties of the sample 28, 29, 33, 36 or 39 are likely to cause a problem in prolonged casting operation. Thus, it is desirable that an inner bore-side layer has the physical properties of the samples 30 to 32, 34, 35, 37 or 38.

Example F

Example F is a result of a test for checking, under a condition that an inner bore-side layer contains a CaO composition and an MgO composition in a total amount of 80 mass % or more, wherein a mass ratio of CaO to MgO (CaO/MgO) is in the range of 0.2 to 1.5, an influence of a value derived by dividing a mass ratio of CaO contained in the inner bore-side layer to the entire inner bore-side layer by a mass ratio of a total of $Al_2O_3$, $SiO_2$ and an alkali metal oxide contained in an intermediate layer to the entire intermediate layer, on a bonding strength, and a result of a simulation test for casting of molten steel based on inner-bore heating.

Table 6 shows a composition and a test result of each sample in Example F.

As is evident from the result of this test, each of the samples 41 to 45, 47 and 48 where the value derived by dividing a mass ratio of CaO contained in the inner bore-side layer to the entire inner bore-side layer by a mass ratio of a total of $Al_2O_3$, $SiO_2$ and an alkali metal oxide contained in an intermediate layer to the entire intermediate layer (the value will hereinafter be referred to as "ratio C/I") is 10 or more, satisfies a requirement that the bonding strength is in the range of 0.1 to 1.5 MPa.

In the simulation test for casting of molten steel based on inner-bore heating, each of the above samples had a desired result.

In contrast, the samples 40 and 46 where the ratio C/I is less than 10, had a bonding strength of less than 0.01 MPa at 1500° C., i.e., could not satisfy the requirement that the bonding strength is 0.1 MPa or more. Moreover, in the simulation test for casting of molten steel based on inner-bore heating, drop-off occurred in the 2nd cycle.

Depending on conditions of casting using the continuous casting nozzle of the present invention, the physical properties of the sample 40 or 46 are likely to cause a problem in prolonged casting operation. Thus, it is desirable that an inner bore-side layer has the physical properties of the samples 41 to 45, 47 and 48.

TABLE 6

|  |  | Sample 40 | Sample 41 | Sample 42 | Sample 43 | Sample 44 | Sample 45 | Sample 46 | Sample 47 | Sample 48 |
|---|---|---|---|---|---|---|---|---|---|---|
| Amount of CaO in inner bore-side layer (=C) | mass % | 50 | 50 | 50 | 50 | 50 | 50 | 16 | 16 | 16 |
| Amount of MgO in inner bore-side layer | mass % | 45 | 45 | 45 | 45 | 45 | 45 | 79 | 79 | 79 |
| Mass ratio (CaO/MgO) |  | 1.1 | 1.1 | 1.1 | 1.1 | 1.1 | 1.1 | 0.2 | 0.2 | 0.2 |
| Amount of low-melting-point inducing substance in intermediate layer (=I) (Total amount of Al2O3 + SiO2 + alkali metal oxide) | mass % | 6 | 5 | 4 | 3 | 2.5 | 0.7 | 3 | 1.6 | 0.8 |
| Ratio C/I |  | 8.3 | 10.0 | 12.5 | 16.7 | 20.0 | 73.3 | 5.3 | 10.0 | 20.0 |
| Bonding strength at 1000° C. | MPa | 0.01 | 0.02 | 0.5 | 0.6 | 0.8 | 1.1 | 0.01 | 0.4 | 0.6 |
| Bonding strength at 1500° C. | MPa | <0.01 | 0.02 | 0.4 | 0.4 | 0.6 | 0.9 | <0.01 | 0.2 | 0.4 |
| Result of inner-bore heating test *1 | 1st cycle | ○ | ○ | ○ | ○ | ○ | ○ | ○ | ○ | ○ |
|  | 2nd cycle | D | ○ | ○ | ○ | ○ | ○ | D | ○ | ○ |
|  | 3rd cycle | — | ○ | ○ | ○ | ○ | ○ | — | ○ | ○ |

*1: ○: no defect, D: drop-off

The sample 31 in Table 5 comprising 50 mass % of CaO component and 45 mass % of MgO component, wherein the mass ratio of CaO to MgO (CaO/MgO) is 1.1, and the sample 32 in Table 5 comprising 16 mass % of CaO component and 79 mass % of MgO component, wherein the mass ratio of CaO to MgO (CaO/MgO) is 0.2, were used as a refractory material of an inner bore-side layer.

A hollow refractory aggregate used in Example F has the same composition and the same particle-size distribution as those of the hollow refractory aggregate used in each of Examples B to D.

In regard to a refractory material of the intermediate layer, based on the composition of the remainder (matrix) after excluding the hollow refractory aggregate, in the sample 7, the total amount of $Al_2O_3$, $SiO_2$ and an alkali metal oxide was adjusted primarily by changing a content of the hollow refractory aggregate.

The measurement of a bonding strength, and the simulation test for casting of molten steel based on inner-bore heating, were carried out in the same manner as that in each of Examples B to D.

EXPLANATORY OF CODES

1: intermediate layer (a layer consisting of a refractory material for an intermediate layer of the present invention)
2: inner bore-side layer
3: alumina-graphite based layer constituting outer periphery-side layer and serving as nozzle body of continuous casting nozzle
4: zirconia-graphite based layer constituting outer periphery-side layer and serving as powder region of continuous casting nozzle
5: inner bore
6: molten-steel inlet opening
7: outlet opening
8: table
9: crosshead
10: test sample (hollow refractory aggregate)
11: container
12: upper liner (jig for pressing based on downward movement)
13: lower liner (jig for pressing based on upward movement)

The invention claimed is:

1. A continuous casting nozzle comprising a tubular refractory structure which has an inner bore formed along an axial direction thereof to allow molten metal to pass therethrough, and includes an inner bore-side layer disposed to define the inner bore and an outer periphery-side layer disposed radially outward of the inner bore-side layer, wherein, in a part or entirety of the tubular refractory structure, a refractory material of the inner bore-side layer has a thermal expansion greater than that of a refractory material of the outer periphery-side layer, the continuous casting nozzle being characterized in that the inner bore-side layer and the outer periphery-side layer are mutually independent shaped bodies, wherein a first one of the shaped bodies serving as the inner bore-side layer is fixed to the other, second, shaped body serving as the outer periphery-side layer through an intermediate layer having compressibility, and wherein:

a bonding strength between the intermediate layer and each of the first shaped body serving as the inner bore-side layer and the second shaped body serving as the outer periphery-side layer is in the range of 0.01 to 1.5 MPa, as measured under a hot condition in a non-oxidation atmosphere at a temperature of 1000 to 1500° C.; and the intermediate layer has a compressive rate K (%) satisfying the following Formula 1, $$K \geqq (Di \times \alpha i - Do \times \alpha o)/(2 \times Tm)$$  Formula 1 wherein:
Di is an outer diameter (mm) of the inner bore-side layer;
Do is an inner diameter (mm) of the outer periphery-side layer;
Tm is an initial thickness (mm) of the intermediate layer at room temperature;
αi is a maximum thermal expansion coefficient (%) of the refractory material of the inner bore-side layer in a temperature range of room temperature to 1500° C.; and
αo is a thermal expansion coefficient (%) of the refractory material of the outer periphery-side layer at a temperature in an initial stage of passing of molten steel through the continuous casting nozzle, wherein the intermediate layer includes an intermediate refractory material which contains a hollow refractory aggregate in an amount of 10 to 75 volume %, wherein a ratio of an average radius R of each particle of the aggregate to an average wall thickness t of the particle satisfies the following relation: R/t≧10.

2. The casting nozzle of claim 1, wherein the hollow refractory aggregate has a glassy structure which contains $SiO_2$ in an amount of 70 mass % or more, and an alkali metal oxide and an alkaline earth metal oxide in a total amount of 1 to 10 mass %.

3. The casting nozzle of claim 1, wherein the intermediate refractory material contains, as a percentage with respect to a total amount of the remainder after excluding the hollow refractory aggregate, one or more materials selected from the group consisting of Al, Si, Mg and an alloy comprising any combination of two or more thereof, in a total amount of 0.5 to 15 mass % in terms of only a content of the metals, and carbon in an amount of 2 to 99.5 mass %.

4. The casting nozzle of claim 1, wherein the intermediate refractory material has a compressive rate of 10 to 80% as measured under a pressure of 2.5 MPa.

5. The casting nozzle of claim 1, wherein the intermediate refractory material has a bonding strength of 0.01 to 1.5 MPa with respect to other refractory material for the continuous casting nozzle, as measured under a hot condition in a non-oxidation atmosphere at a temperature of 1000 to 1500° C.

6. A continuous casting nozzle comprising a tubular refractory structure which has an inner bore formed along an axial direction thereof to allow molten metal to pass therethrough, and includes an inner bore-side layer disposed to define the inner bore and an outer periphery-side layer disposed radially outward of the inner bore-side layer, wherein, in a part or entirety of the tubular refractory structure, a refractory material of the inner bore-side layer has a thermal expansion greater than that of a refractory material of the outer periphery-side layer, the continuous casting nozzle being characterized in that the inner bore-side layer and the outer periphery-side layer are mutually independent shaped bodies, wherein a first one of the shaped bodies serving as the inner bore-side layer is fixed to the other, second, shaped body serving as the outer periphery-side layer through an intermediate layer having compressibility, and wherein:

a bonding strength between the intermediate layer and each of the first shaped body serving as the inner bore-side layer and the second shaped body serving as the outer periphery-side layer is in the range of 0.01 to 1.5 MPa, as measured under a hot condition in a non-oxidation atmosphere at a temperature of 1000 to 1500° C.; and the intermediate layer has a compressive rate K (%) satisfying the following Formula 1, $$K \geqq (Di \times \alpha i - Do \times \alpha o)/(2 \times Tm)$$  Formula 1 wherein:
Di is an outer diameter (mm) of the inner bore-side layer;
Do is an inner diameter (mm) of the outer periphery-side layer;
Tm is an initial thickness (mm) of the intermediate layer at room temperature;
αi is a maximum thermal expansion coefficient (%) of the refractory material of the inner bore-side layer in a temperature range of room temperature to 1500° C.; and
αo is a thermal expansion coefficient (%) of the refractory material of the outer periphery-side layer at a temperature in an initial stage of passing of molten steel through the continuous casting nozzle, wherein the intermediate layer contains a hollow refractory aggregate in an amount of 10 to 75 volume %, wherein a ratio of an average radius R of each particle of the hollow refractory aggregate to an average wall thickness t of the particle satisfies the following relation: R/t≧10, the intermediate layer further containing, as a percentage with respect to a total amount of the remainder after excluding the hollow refractory aggregate, one or more selected from the group consisting of Al, Si, Mg and an alloy comprising any combination of two or more thereof, in a total amount of 0.5 to 15 mass % in terms of only a content of the metals, and carbon in an amount of 2 to 99.5 mass %; and the inner bore-side layer contains a CaO composition and an MgO composition in a total amount of 80 mass % or more, wherein a mass ratio of CaO to MgO (CaO/MgO) is in the range of 0.2 to 1.5, and wherein a value derived by dividing a mass ratio of CaO contained in the inner bore-side layer to the entire inner bore-side layer by a mass ratio of a total of $Al_2O_3$, $SiO_2$ and an alkali metal oxide contained in the intermediate layer to the entire intermediate layer is 10 or more.

7. A continuous casting nozzle comprising:
- a tubular inner bore configured to allow molten metal to pass therethrough;
- an inner bore-side layer including an inner refractory material, said inner bore-side layer disposed to define the inner surface of said tubular inner bore;
- an outer periphery-side layer disposed radially outward of the inner bore-side layer, and including an outer refractory material having a thermal expansion less than that of the inner refractory material, the outer periphery-side layer having an independent shaped body relative to a body shape of said inner bore-side layer;
- a compressible intermediate layer disposed between said inner bore-side layer and said outer periphery side layer, said intermediate layer including an intermediate refractory material including a hollow refractory aggregate in an amount of 10 to 75 volume %, wherein a ratio of an average radius R of each particle of the aggregate to an average wall thickness t of the particle satisfies the relation $R/t \geq 10$.

8. The casting nozzle of claim 7, wherein the hollow refractory aggregate has a glassy structure which contains $SiO_2$ in an amount of 70 mass % or more, and an alkali metal oxide and an alkaline earth metal oxide in a total amount of 1 to 10 mass %.

9. The casting nozzle of claim 7, wherein the intermediate refractory material contains, as a percentage with respect to a total amount of the remainder after excluding the hollow refractory aggregate, one or more materials selected from the group consisting of Al, Si, Mg and an alloy comprising any combination of two or more thereof, in a total amount of 0.5 to 15 mass % in terms of only a content of the metals, and carbon in an amount of 2 to 99.5 mass %.

10. The casting nozzle of claim 7, wherein the intermediate refractory material has a compressive rate of 10 to 80% as measured under a pressure of 2.5 MPa.

11. The casting nozzle of claim 7, wherein the intermediate refractory material has a bonding strength of 0.01 to 1.5 MPa with respect to other refractory material for the continuous casting nozzle, as measured under a hot condition in a non-oxidation atmosphere at a temperature of 1000 to 1500° C.

12. The casting nozzle of claim 7, wherein said intermediate layer has a compressive rate K (%) satisfying the formula $K \geq (Di \times \alpha i - Do \times \alpha o)/(2 \times Tm)$, where Di is an outer diameter (mm) of the inner bore-side layer, Do is an inner diameter (mm) of the outer periphery-side layer, Tm is an initial thickness (mm) of the intermediate layer at room temperature, $\alpha i$ is a maximum thermal expansion coefficient (%) of the refractory material of the inner bore-side layer in a temperature range of room temperature to 1500° C.; and $\alpha o$ is a thermal expansion coefficient (%) of the refractory material of the outer periphery-side layer at a temperature in an initial stage of passing of molten steel through the continuous casting nozzle.

13. The casting nozzle of claim 7, wherein:
- the intermediate layer further contains, as a percentage with respect to a total amount of the remainder after excluding the hollow refractory aggregate, one or more selected from the group consisting of Al, Si, Mg and an alloy comprising any combination of two or more thereof, in a total amount of 0.5 to 15 mass % in terms of only a content of the metals, and carbon in an amount of 2 to 99.5 mass %; and
- the inner bore-side layer contains a CaO composition and an MgO composition in a total amount of 80 mass % or more, wherein a mass ratio of CaO to MgO (CaO/MgO) is in the range of 0.2 to 1.5, and wherein a value derived by dividing a mass ratio of CaO contained in the inner bore-side layer to the entire inner bore-side layer by a mass ratio of a total of $Al_2O_3$, $SiO_2$ and an alkali metal oxide contained in the intermediate layer to the entire intermediate layer is 10 or more.

14. A continuous casting nozzle comprising:
- a tubular inner bore configured to allow molten metal to pass therethrough;
- an inner bore-side layer including a refractory material, said inner bore-side layer disposed to define the inner surface of said tubular inner bore;
- an outer periphery-side layer disposed radially outward of the inner bore-side layer, and including a refractory material having a thermal expansion less than that of the refractory material of said inner bore-side layer, the outer periphery-side layer having an independent shaped body relative to a body shape of said inner bore-side layer;
- a compressible intermediate layer disposed between said inner bore-side layer and said outer periphery side layer, said intermediate layer including a hollow refractory aggregate in an amount of 10 to 75 volume %, wherein a ratio of an average radius R of each particle of the aggregate to an average wall thickness t of the particle satisfies the following relation $R/t \geq 10$, said intermediate layer bonded to said inner bore-side layer and said outer periphery-side layer with a bonding strength in the range of 0.01 to 1.5 MPa, as measured under a hot condition in a non-oxidation atmosphere at a temperature of 1000 to 1500° C.

15. The casting nozzle of claim 14, wherein the hollow refractory aggregate has a glassy structure which contains $SiO_2$ in an amount of 70 mass % or more, and an alkali metal oxide and an alkaline earth metal oxide in a total amount of 1 to 10 mass %.

16. The casting nozzle of claim 14, wherein the intermediate refractory material contains, as a percentage with respect to a total amount of the remainder after excluding the hollow refractory aggregate, one or more materials selected from the group consisting of Al, Si, Mg and an alloy comprising any combination of two or more thereof, in a total amount of 0.5 to 15 mass % in terms of only a content of the metals, and carbon in an amount of 2 to 99.5 mass %.

17. The casting nozzle of claim 14, wherein the intermediate refractory material has a compressive rate of 10 to 80% as measured under a pressure of 2.5 MPa.

18. The casting nozzle of claim 14, wherein the intermediate refractory material has a bonding strength of 0.01 to 1.5 MPa with respect to other refractory material for the continuous casting nozzle, as measured under a hot condition in a non-oxidation atmosphere at a temperature of 1000 to 1500° C.

19. The casting nozzle of claim 14, wherein said intermediate layer has a compressive rate K (%) satisfying the formula $K \geq (Di \times \alpha i - Do \times \alpha o)/(2 \times Tm)$, where Di is an outer diameter (mm) of the inner bore-side layer, Do is an inner diameter (mm) of the outer periphery-side layer, Tm is an initial thickness (mm) of the intermediate layer at room temperature, $\alpha i$ is a maximum thermal expansion coefficient (%) of the refractory material of the inner bore-side layer in a temperature range of room temperature to 1500° C.; and $\alpha o$ is a thermal expansion coefficient (%) of the refractory material of the outer periphery-side layer at a temperature in an initial stage of passing of molten steel through the continuous casting nozzle.

20. The continuous casting nozzle as defined in claim 14, wherein:

the intermediate layer further contains, as a percentage with respect to a total amount of the remainder after excluding the hollow refractory aggregate, one or more selected from the group consisting of Al, Si, Mg and an alloy comprising any combination of two or more thereof, in a total amount of 0.5 to 15 mass % in terms of only a content of the metals, and carbon in an amount of 2 to 99.5 mass %; and the inner bore-side layer contains a CaO composition and an MgO composition in a total amount of 80 mass % or more, wherein a mass ratio of CaO to MgO (CaO/MgO) is in the range of 0.2 to 1.5, and wherein a value derived by dividing a mass ratio of CaO contained in the inner bore-side layer to the entire inner bore-side layer by a mass ratio of a total of $Al_2O_3$, $SiO_2$ and an alkali metal oxide contained in the intermediate layer to the entire intermediate layer is 10 or more.

* * * * *